(12) United States Patent
Newman

(10) Patent No.: US 9,481,471 B2
(45) Date of Patent: Nov. 1, 2016

(54) AUTONOMOUS PROPULSION APPARATUS AND METHODS

(71) Applicant: The Boeing Company, Chicago, IL (US)

(72) Inventor: Daniel Newman, Lafayette Hill, PA (US)

(73) Assignee: THE BOEING COMPANY, Chicago, IL (US)

( * ) Notice: Subject to any disclaimer, the term of this patent is extended or adjusted under 35 U.S.C. 154(b) by 425 days.

(21) Appl. No.: 14/076,797

(22) Filed: Nov. 11, 2013

(65) Prior Publication Data

US 2016/0009404 A1  Jan. 14, 2016

(51) Int. Cl.
| | |
|---|---|
| *F02K 3/00* | (2006.01) |
| *B64D 31/06* | (2006.01) |
| *B64D 31/00* | (2006.01) |
| *B64C 11/00* | (2006.01) |

(52) U.S. Cl.
CPC ............. *B64D 31/06* (2013.01); *B64C 11/001* (2013.01); *B64D 31/00* (2013.01); *F02K 3/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,046,685 A | * | 9/1991 | Bose ..................... | B64C 39/064 244/12.2 |
| 2006/0231675 A1 | * | 10/2006 | Bostan ................... | B64C 3/385 244/12.1 |
| 2009/0294573 A1 | * | 12/2009 | Wilson .................. | B64C 39/024 244/2 |
| 2010/0292870 A1 | | 11/2010 | Saint Marc et al. | |
| 2010/0305826 A1 | | 12/2010 | Fernandez | |
| 2011/0315806 A1 | | 12/2011 | Piasecki et al. | |
| 2012/0095662 A1 | | 4/2012 | Roy et al. | |
| 2012/0158215 A1 | | 6/2012 | Sun et al. | |
| 2013/0184903 A1 | | 7/2013 | Evrard et al. | |
| 2013/0206915 A1 | * | 8/2013 | Desaulniers .......... | B64C 39/024 244/165 |

OTHER PUBLICATIONS

Canadian Intellectual Property Office, "Examiner's Report", issued in connection with Canadian Patent Application No. 2,863,559, issued on Nov. 27, 2015, 3 pages.
European Patent Office, "Extended European Search Report," issued in connection with Application No. 14192537.0, May 8, 2015, 5 pages.

* cited by examiner

*Primary Examiner* — Thomas Tarcza
*Assistant Examiner* — Edward J Pipala
(74) *Attorney, Agent, or Firm* — Hanley, Flight & Zimmerman, LLC

(57) ABSTRACT

Autonomous propulsion apparatus and methods are disclosed. An example autonomous propulsion unit includes a flight controller capable of executing flight control instructions stored in a memory of the autonomous propulsion unit; and a propulsor to generate propulsion in accordance with the instructions for a payload carrier to which the autonomous propulsion unit is coupled, wherein the flight controller is to provide flight control for the propulsor in an absence of flight control instructions from the payload carrier.

27 Claims, 18 Drawing Sheets

AUTONOMOUS PROPULSION APPARATUS AND METHODS

FIELD OF THE DISCLOSURE

This disclosure relates generally to aircraft and, more particularly, autonomous propulsion apparatus and methods.

BACKGROUND

Aircraft components and systems are conventionally developed specifically for a single configuration or purpose for a particular aircraft. For example, development of a particular helicopter involves designing a particular rotor based on specifications and/or requirements for that particular helicopter (e.g., size, power, and/or other requirements or desires).

SUMMARY

Autonomous propulsion apparatus and methods are disclosed. A disclosed example autonomous propulsion apparatus includes a flight controller capable of executing flight control instructions stored in a memory of the autonomous propulsion unit; and a propulsor to generate propulsion in accordance with the instructions for a payload carrier to which the autonomous propulsion unit is coupled, wherein the flight controller is to provide flight control for the propulsor in an absence of flight control instructions from the payload carrier.

A disclosed example aircraft includes a body; a first propulsion unit mounted to the body, the first propulsion unit including a first flight controller; and a second propulsion unit mounted to the body, the second propulsion unit including a second flight controller, wherein the first flight controller is to communicate with the second flight controller to provide flight capabilities to the body without receiving a flight control instruction from the body.

A disclosed example method for a flight controller implemented on an autonomous propulsion unit includes determining a configuration of an aircraft formed by the autonomous propulsion unit, wherein the configuration indicates a number of autonomous propulsion units mounted to a body; selecting a flight control program based on the determined configuration; and executing the selected flight control program to provide flight capability to the aircraft without receiving flight control instructions from the body.

Figure 1:
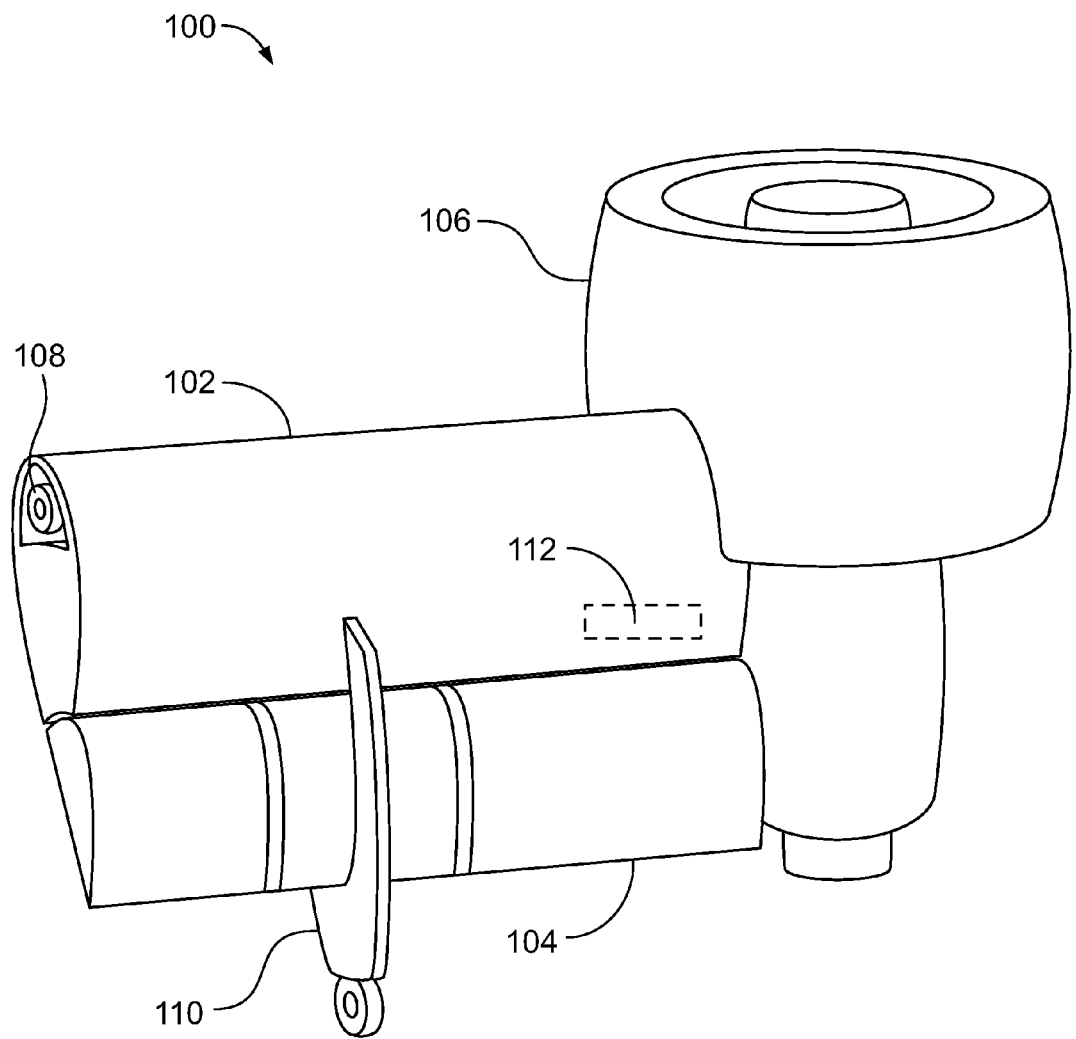
FIG. 1 is an illustration of an example autonomous propulsion unit (APU) constructed in accordance with teachings of this disclosure.

To clarify multiple layers and regions, the thicknesses of the layers are enlarged in the drawings. Accordingly, the structures illustrated in the drawings are not drawn to scale and, instead, are drawn to clarify the teachings of this disclosure. Wherever possible, the same reference numbers will be used throughout the drawing(s) and accompanying written description to refer to the same or like parts. As used in this patent, stating that any part (e.g., a layer, film, or area) is in any way positioned on (e.g., positioned on, located on, disposed on, attached to, or formed on, etc.) another part, means that the referenced part is either in contact with the other part, or that the referenced part is adjacent the other part with one or more intermediate part(s) located therebetween. Stating that any part is in contact with another part means that there is no intermediate part between the two parts.

DETAILED DESCRIPTION

Example apparatus disclosed herein are self-contained, autonomous propulsion units that independently provide propulsion and/or flight capabilities to a body, such as a payload carrying shell that is incapable of flight in the absence of external source(s) of propulsion and/or flight control capabilities. Examples disclosed herein are autonomous or self-contained in that, as standalone devices, the examples disclosed herein provide propulsion (e.g., thrust and/or lift) and/or flight control capability to a body to which the unit is mounted without relying on external systems (e.g., systems other than the example autonomous units disclosed herein). For example, autonomous units disclosed herein provide propulsion and/or flight capability to a body without relying on external processing capabilities (e.g., without relying on an external flight computer), without receiving power from an external power source, and/or without relying on an external energy source. Instead, the examples disclosed herein are self-contained in that each unit includes all of the components needed to provide propulsion and/or flight capability to an attached body, even when the attached body is, for example, an empty shell configured for carrying payload. As described in detail below, example propulsion units disclosed herein include their own energy source (e.g., battery and/or fossil fuel), their own power plant (e.g., a motor, engine and/or other converter of stored energy into a mechanical force), their own propulsor (e.g., a duct fan coupled to a turbo shaft), their own flight-control-capable logic circuit (e.g., processor(s) having flight control programming and/or applications), their own aerodynamic surface(s) (e.g., a rigid wing and/or an adjustable flap), their own support structure (e.g., landing gear), and/or additional or alternative components to enable autonomous provision of propulsion and/or flight control.

The example autonomous propulsion units disclosed herein can be combined or arranged on any suitable body or structure for which propulsion and/or flight capability is desired. For example, a plurality of the example autonomous propulsion units disclosed herein can be mounted to a structure that is not independently capable of flight. For example, the structure may be a payload carrying shell void of any energy source or processing capability. In such instances, the example propulsion units can be mounted to the payload carrying shell in any desired configuration to provide the flight-incapable shell with flight capability without receiving, for example, any electronic input (e.g., flight control instructions) or power from the payload carrying shell. Instead, the example propulsion units disclosed herein are self-contained and autonomous and provide flight capability to the payload carrying shell via the components contained therein and, in some examples, by communicating with each other. In other words, flight control processing components of the example autonomous propulsion units disclosed herein may embody the entire flight control processing capabilities of an aircraft assembled using the examples disclosed herein. The examples disclosed herein are especially useful for flight personnel (e.g., designers, technicians, etc.) deployed in the field (e.g., a remotely located base) that require particular airborne capabilities for a particular task but do not have access to inventory and/or a functional aircraft having the required capabilities. In such instances, the flight personnel can design and/or assemble an aircraft using one or more of the autonomous propulsion units disclosed herein. Example implementations of such aircraft created using the examples disclosed herein are described below.

Additionally or alternatively, the example self-contained, autonomous propulsion units disclosed herein can supplement system(s) of an existing aircraft that is independently capable of flight (e.g., has a native propulsion system and/or native flight control processing capabilities). For example, the example apparatus disclosed herein can supplement such an aircraft by providing auxiliary, additional and/or replacement thrust and/or lift. For example, the autonomous propulsion units disclosed herein may be mounted (e.g., removably bolted) to an aircraft having its own (e.g., native) propulsion system(s) that is tasked with carrying a particularly heavy payload (e.g., a payload that exceeds or approaches the lift capabilities of the aircraft). In such instances, one or more of the example autonomous propulsion units disclosed herein can be temporarily added to the aircraft to provide additional thrust and/or lift such that the aircraft can perform the difficult task without straining (e.g., approaching the structural integrity limits of) the aircraft. When the particularly heavy payload has been delivered, the example autonomous propulsion units disclosed herein may be removed or disengaged from the aircraft, if desired, leaving the aircraft to operate according to a base configuration (e.g., with only the dedicated, existing propulsion system of the aircraft). Example uses of the autonomous propulsion units disclosed herein to supplement base configurations of aircraft are described below.

Additionally or alternatively, the example autonomous propulsion units disclosed herein can change from (1) providing supplementary propulsion and/or flight control capabilities to an independently flight-capable aircraft to (2) being the sole source of propulsion and/or flight control capability for a flight incapable aircraft that disconnects from the flight-capable aircraft mid-flight. For example, an assembly made from the propulsion units disclosed herein may be detachably mounted (e.g., removably bolted) to an aircraft having its own (e.g., native) propulsion system(s) such that the assembly can be detached from the aircraft mid-flight and operated as a standalone aircraft (e.g., an unmanned aircraft). In such instances, the example propulsion units change from operating in a supplementary mode (e.g., when mounted to the flight-capable aircraft) to a solitary mode (e.g., when disengaged from the flight-capable aircraft). Example uses of the autonomous propulsion units disclosed herein to interchangeably operate in different modes are described below.

FIG. 1 illustrates an example autonomous propulsion unit (APU) 100 constructed in accordance with teachings this disclosure. The example APU 100 of FIG. 1 includes a rigid aerodynamic member 102 and an adjustable aerodynamic member 104. In the example of FIG. 1, the rigid aerodynamic member 102 includes an internal housing (shown in FIG. 2) to carry an energy source, such as fuel, a battery bank, and/or any other suitable source of energy. In some examples, the adjustable aerodynamic member 104 is a single member that can be adjusted to different positions to provide configurations corresponding to, for example, stage(s) of flight and/or maneuver(s). In some examples, the adjustable aerodynamic surface 104 includes a plurality (e.g., three) of independently adjustable sections (e.g., flaps) to provide a plurality of configurations, each of which corresponds to, for example, stage(s) of flight and/or maneuver(s).

In the example of FIG. 1, a propulsor 106 is coupled to one or both of the aerodynamic members 102, 104. The example propulsor 106 of FIG. 1 is a duct fan. However, any suitable type of propulsor 106 can be utilized by the example APU 100. In the example of FIG. 1, the propulsor 106 is tiltable relative to, for example, one or both of the aerodynamic members 102, 104 via a tilt shaft 108 (shown in FIG. 2 and discussed further below). However, the example APU 100 of FIG. 1 may not include the tilt shaft 108 and the propulsor 106 may be rigidly mounted to, for example, the rigid aerodynamic member 102. The example APU 100 of FIG. 1 also includes a support structure 110. In the example of FIG. 1, the support structure 110 is a wheel assembly to facilitate movement, storage, and/or landing of a craft utilizing the example APU 100. Additional or alternative support structures may be included on the APU 100.

Additionally, the example APU 100 of FIG. 1 includes a flight controller 112 that provides flight control capabilities. That is, the example flight controller 112 of FIG. 1 executes flight control programming and/or application(s) to control the components (e.g., the propulsor 106, the tilt shaft 108, the adjustable aerodynamic member 104, etc.) of the APU 100 based on, for example, condition(s) detected via sensor(s) and/or pilot input(s). While shown as housed in the rigid aerodynamic member 102 of the APU 100 in FIG. 1, the example flight controller 112 can be located at any suitable position within or on any component of the example APU 100. The example flight controller 112 of FIG. 1 is capable of providing full flight control to the APU 100 without relying on or receiving data (e.g., instructions) from an external flight control source. In particular, the example flight controller 112 of FIG. 1 is loaded with application(s) and/or programming (e.g., which can be updated and/or modified by, for example, a ground based memory system of computing platform) that enable the example APU 100 to provide full flight control to a payload carrying shell or body void of any flight computer and/or processing capabilities. For example, even when mounted to an empty shell, the example APU 100 of FIG. 1 and the flight controller 112 thereof provide flight capability to the aircraft formed by the example APU 100 and the shell. Further, as the example APU 100 of FIG. 1 includes its own energy source and its own propulsor 106, the example APU 100 of FIG. 1 is a fully self-contained apparatus that provides flight capability to the empty shell without receiving energy, power, flight control instructions and/or propulsion from an external source. However, the flight controller 112 of the example APU 100 of FIG. 1 is also capable of communicating and/or interacting with external sensors, flight controller(s), etc. The example flight controller 112 of FIG. 1 is described in greater detail below in connection with FIGS. 3 and 4.

Figure 2:
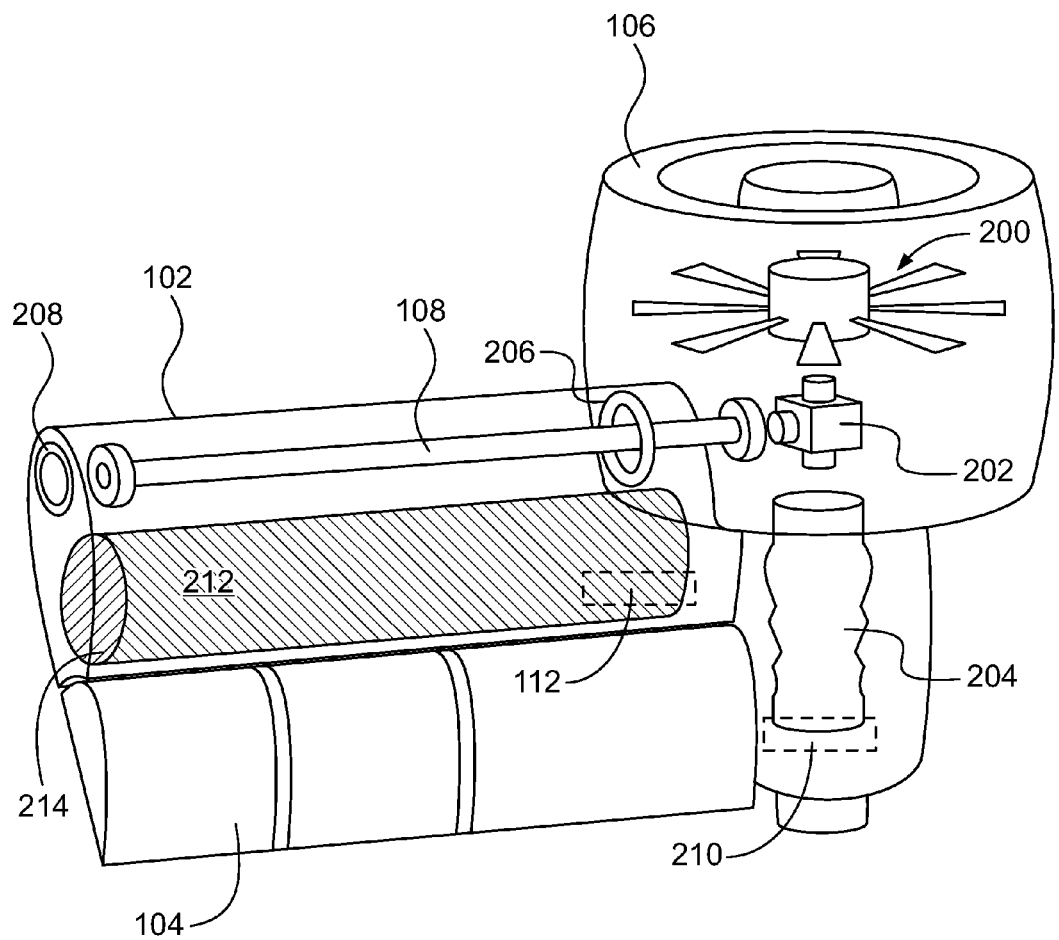
FIG. 2 is another illustration of the example APU of FIG. 1.

FIG. 2 is a view of the example APU 100 of FIG. 1 showing certain internal aspects of the APU 100. In the example of FIG. 2, the example propulsor 106 includes a fan assembly 200 coupled to a gearbox 202. In the example of FIG. 2, the gearbox 202 is coupled to a drive shaft 204 (e.g., a turbo shaft) and the tilt shaft 108, which engages first and second tile bearings 206, 208. In the example of FIG. 2, an engine 210 converts an energy source 212 into a mechanical force that rotates the drive shaft 204. The example drive shaft 204 of FIG. 2 engages the gear box 202 which, in turn, drives the example fan assembly 200 and/or the example tilt shaft 108. In the example of FIG. 2, the energy source 212 of the APU 100 is a fuel (e.g., a carbon based fuel) carried by an internal housing or tank 214 of the rigid aerodynamic member 102. Additional or alternative energy source(s), such as a battery bank, and/or housing(s) can be utilized by the example APU 100 of FIG. 1. As described in detail below in connection with FIG. 3, the example flight controller 112 executes flight control application(s) and/or programming and communicates corresponding flight control instructions to the components of the example APU 100. Accordingly, the example flight controller 112 is in communication with, for example, the gearbox 202, a fuel injection system of the engine 210, the adjustable aerodynamic member 104, and/or sensor(s) associated with any of the components of the example APU 100.

Figure 3:
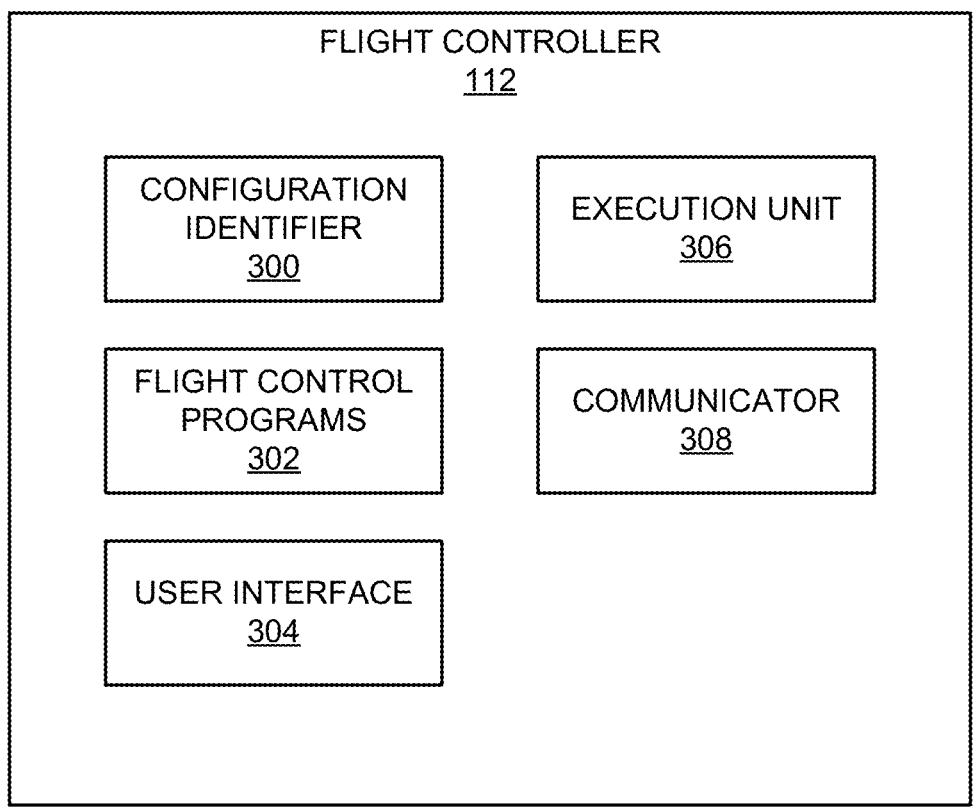
FIG. 3 is a block diagram of an example implementation of the example flight controller of FIGS. 1 and/or 2.

FIG. 3 is a block diagram representative of an example implementation of the example flight controller 112 of FIGS. 1 and/or 2. The example flight controller 112 enables the APU 100 to provide flight control capabilities to a body that is otherwise incapable of executing flight control programming (e.g., when the example APU 100 is mounted to a payload carrying shell by itself or with other APUs). Additionally or alternatively, the example flight controller 112 enables the APU 100 to collaborate with and/or take orders from another flight control system when, for example, the APU 100 is mounted to a flight-capable aircraft to supplement (e.g., provide additional, replacement and/or auxiliary lift and/or thrust) the existing propulsion system of the flight-capable aircraft. Put another way, the example flight controller 112 executes flight control programming and/or application(s) for a plurality of different aircraft configurations and/or designs. In the illustrated example, the flight control programming and/or application(s) to be executed by the flight controller 112 depends on the particular configuration and/or design of the aircraft currently utilizing the APU 100. To determine an aircraft configuration for which the flight controller 112 is providing and/or supplementing flight control, the example flight controller 112 of FIG. 3 includes a configuration identifier 300. As illustrated in the examples discussed below, two or more of the example APU 100 of FIGS. 1 and/or 2 can be combined (e.g., mounted to a common body or structure) to form any desired configuration and/or type of aircraft (e.g., an unmanned payload carrying VTOL (vertical take-off and landing) aircraft and/or V/STOL (vertical and/or short take-off and landing) aircraft, a manned airplane, etc.). In such instances, the example configuration identifier 300 identifies parameters, orientations, specifications, capabilities, etc. of the APU(s) 100 and the parameters, orientations, specifications, shapes, geometries, capabilities, etc. of the body or bodies to which the APUs 100 are mounted. In some examples, the configuration identifier 300 is manually provided with some or all of the information by, for example, a technician. In some examples, the configuration identifier 300 includes detection logic to automatically determine information associated with the aircraft, such as a number of APU(s) 100 being utilized and/or a configuration or arrangement thereof. In such instances, the configuration identifier 300 polls components with which the APU 100 is in communication to determine whether additional APU(s) have been mounted to the aircraft. In some examples, the configuration identifier 300 determines that the corresponding APU 100 has been mounted to a flight-capable aircraft (e.g., an unmanned VTOL having its own propulsion system). That is, the example configuration identifier 300 may determine that the APU 100 is being used to supplement a base configuration of an existing aircraft and/or to replace a base configuration component of the existing aircraft. In some examples, such information is provided by a processing system of the aircraft and/or otherwise conveyed to the flight controller 112 (e.g., by a technician). Additionally or alternatively, the example configuration identifier 300 may actively query a detected external processing system for information regarding, for example, the base configuration of the aircraft. Additionally, the example configuration identifier 300 may be updated (e.g., periodically and/or in response to released information) with data and/or logic to enable the configuration identifier 300 to identify additional or alternative configurations.

The example configuration identifier 300 of FIG. 3 uses the gathered information to select one or more flight control programs and/or applications for the current aircraft. In the illustrated example of FIG. 3, the flight controller 112 includes a plurality of flight control programs 302 from which the configuration identifier 300 selects one or more of the appropriate flight control programs. That is, depending on the configuration, shape, number of APU(s) 100, and/or any other suitable characteristic(s), the example configuration identifier 300 of FIG. 3 selects one or more of the flight control programs 302. The example flight control programs 302 of FIG. 3 can be updated to include additional or alternative information (e.g., configurations) according to, for example, a schedule and/or released information. Additionally, the example flight controller 112 of FIG. 3 includes a user interface 304 to enable a user (e.g., a designer, technician, and/or programmer) of the example APU 100 to provide customized flight control programming and/or application(s) that, in some examples, correspond to particular aircraft configuration(s), APU orientation(s), APU capabilit(ies), etc. Data entered via the user interface 304 can be stored as, for example, one or more of the flight control programs 302. The example user interface 304 of FIG. 3 can be used to exchange additional or alternative type(s) of data with the example flight controller 112.

The example flight controller 112 of FIG. 3 includes an execution unit 306 to execute instructions of the selected one(s) of the flight control programs 302. For example, the execution unit 306 executes the selected flight control program(s) 302 to evaluate conditions associated with the APU 100 and to respond to detected condition(s). Additionally or alternatively, the example execution unit 306 executes the selected flight control program(s) 302 to receive and perform tasks associated with instructions sent to the flight controller 112. Example conditions associated with the APU 100 on which the execution unit 306 acts in accordance with the selected flight control program(s) 302 include weather conditions, airspeed, altitude, payload weight, and/or any other condition related to flight control operations. The condition data is collected via, for example, sensors deployed on the components of the APU 100 and/or the body onto which the APU 100 is mounted. Instructions provided to the example execution unit 306 are received from, for example, a pilot, autopilot functionality of the selected flight control program(s) 302, a flight controller of another APU 100, and/or an external flight control system (e.g., when the APU 100 is mounted to a flight capable aircraft having its own flight control computer). Data received from a pilot may originate on the aircraft (e.g., when the aircraft is a manned aircraft) and/or from an external system (e.g., when the aircraft is an unmanned aircraft). The example execution unit 306 evaluates the condition data, the provided instructions, and/or any other suitable data to identify one or more appropriate flight control responses in accordance with, for example, the selected flight control program(s) 302. The example execution unit 306 executes the appropriate responses by, for example, sending signal(s) to the corresponding components of the APU 100. For example, when the example execution unit 306 determines that an aircraft utilizing the APU 100 is taking off, the example execution unit 306 causes the APU 100 to generate lift by instructing the engine 206 to rotate the drive shaft 204 to thereby engage the fan assembly 200 of the propulsor 106. In another example, when the example execution unit 306 determines that the aircraft utilizing the APU 100 is performing an in-flight maneuver (e.g., a turn, climb, dive, bank, etc.), the example execution unit 306 causes one or more sections of the adjustable aerodynamic member 104 to adjust to a particular configuration (e.g., angular position) depending on, for example, the type of maneuver. The example execution unit 306 of FIG. 3 performs additional computations and provides additional signals to realize full flight control capability for the example APU 100.

The example execution unit 306 of FIG. 3 utilizes a communicator 308 to transmit and receive information. In some examples, when two or more of the APUs 100 of FIG. 1 are combined to form an aircraft (e.g., mounted to a payload carrying shell), the flight controllers 112 of the APUs 100 communicate (e.g., via wires or wirelessly) with each other via the corresponding communicators 308 to collaboratively control the flight of the aircraft formed by the combination of APUs 100. In such instances, the collaboration is defined by the corresponding one or more of the flight control programs 302. In some such instances, the communicators 308 of the flight controllers 112 collaborate according to, for example, a master slave arrangement in which one of the flight controllers 112 is designated as a master device and the remaining flight controller(s) 112 are designated as slave devices. Alternatively, when one or more of the example APUs 100 of FIG. 1 is added to an existing aircraft as, for example, an auxiliary propulsion system and/or unit, the communicator 308 of FIG. 3 exchanges data with processing equipment (e.g., a flight control computer) of the existing aircraft and/or other communicator(s) 308 of other APU(s) 100 also mounted to the aircraft. For example, the example APU 100 of FIG. 1 may be mounted (e.g., temporarily for a particular task or mission) to a rotor craft (e.g., a heavy lift helicopter) having its own flight control computer, its own energy source, its own propulsion systems, etc. to provide the rotor craft with additional thrust and/or lift. In such instances, although capable of operating without receiving data and/or instructions from the flight control computer of the rotor craft to which the APU 100 is mounted, the example communicator 308 of the example flight controller 112 may communicate with the flight control computer of the rotor craft to coordinate flight operations. For example, the flight control computer of the rotor craft may assume the role of master device to the slave APU 100.

While an example manner of implementing the flight controller 112 of FIGS. 1 and/or 2 is illustrated in FIG. 3, one or more of the elements, processes and/or devices illustrated in FIGS. 1, 2 and/or 3 may be combined, divided, re-arranged, omitted, eliminated and/or implemented in any other way. Further, the example configuration identifier 300, the example user interface 304, the example execution unit 306, the example communicator 308 and/or, more generally, the example flight controller 112 of FIG. 3 may be implemented by hardware, software, firmware and/or any combination of hardware, software and/or firmware. Thus, for example, any of the example configuration identifier 300, the example user interface 304, the example execution unit 306, the example communicator 308 and/or, more generally, the example flight controller 112 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example configuration identifier 300, the example user interface 304, the example execution unit 306, the example communicator 308 and/or, more generally, the example flight controller 112 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example flight controller 112 of FIG. 3 may include one or more elements, processes and/or devices in addition to, or instead of, those illustrated in FIG. 3, and/or may include more than one of any or all of the illustrated elements, processes and devices.

Figure 4:
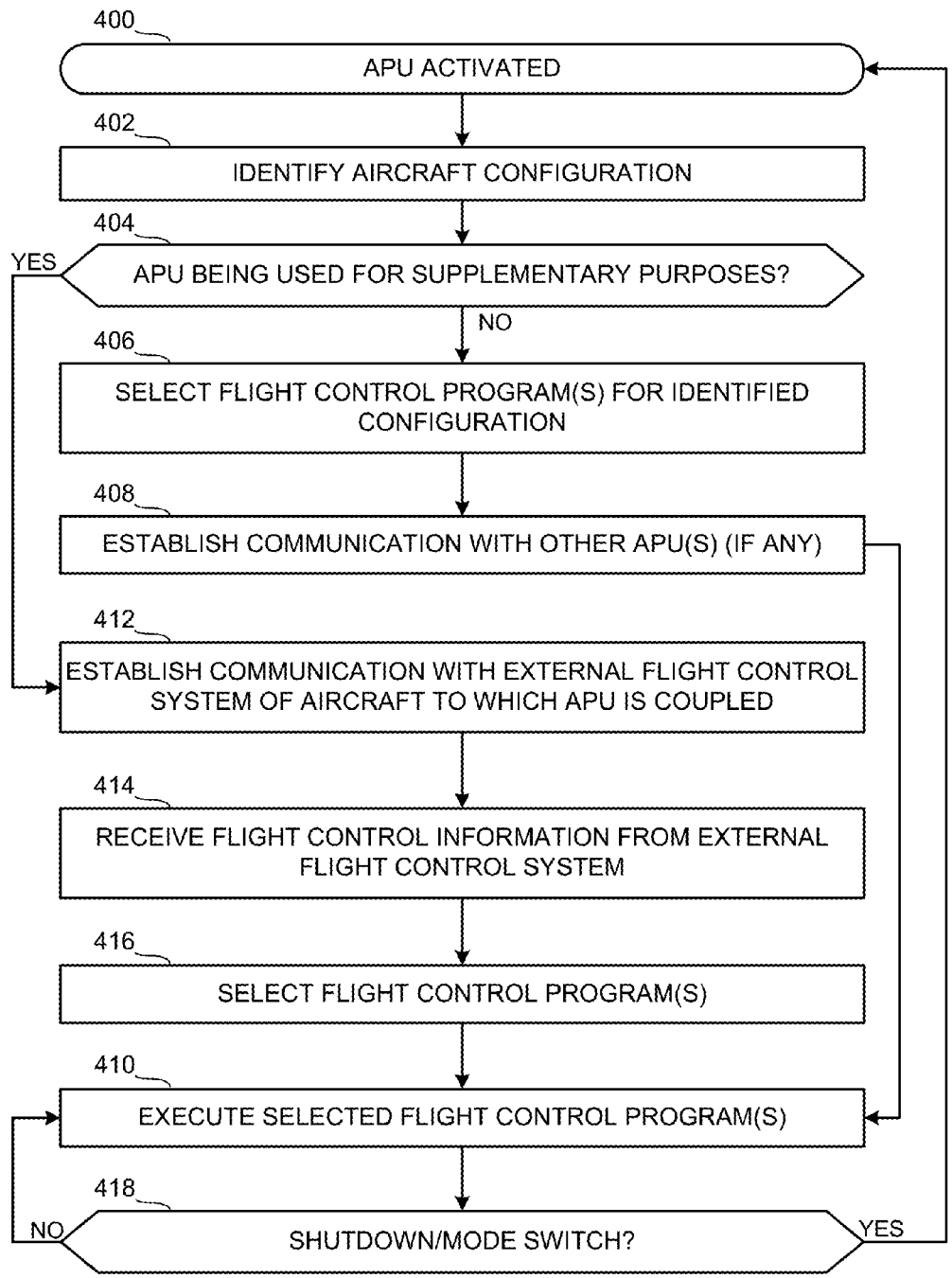
FIG. 4 is a flowchart representative of an example process that may be performed to implement the example flight controller of FIGS. 1, 2 and/or 3.

A flowchart representative of an example process to implement the example flight controller 112 of FIGS. 1, 2 and/or 3 is shown in FIG. 4. In this example, the processes may be implemented using machine readable instructions that comprise a program or programs for execution by a processor such as the processor 1612 shown in the example processor platform 1600 discussed below in connection with FIG. 16. The program(s) may be embodied in software stored on a tangible computer readable storage medium such as a CD-ROM, a floppy disk, a hard drive, a digital versatile disk (DVD), a Blu-ray disk, or a memory associated with the processor 1612, but the entire program(s) and/or parts thereof could alternatively be executed by a device other than the processor 1612 and/or embodied in firmware or dedicated hardware. Further, although the example program(s) are described with reference to the flowchart illustrated in FIG. 4, many other methods of implementing the example flight controller 112 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example of FIG. 4 begins with an indication that the example APU 100 of FIGS. 1 and/or 2 is activated (block 400). Such an indication corresponds to, for example, the example APU 100 being initiated for the first time or the example APU 100 being repurposed for a new task and/or aircraft. At an initial stage of initiation (e.g., during a boot stage), the example configuration identifier 300 of the flight controller 112 determines a configuration of the aircraft currently utilizing the APU 100 (block 402). The information determined by the example configuration identifier 300 includes, for example, placement information indicative of an arrangement of the APU(s) 100 and/or propulsion system(s) of an existing aircraft, shape information indicative of geometries of the body to which the APU(s) 100 are mounted, master-slave relationship(s) between flight controllers, etc.

The configuration determined by the example configuration identifier 300 may correspond to an aircraft formed with the APU 100 (and/or other APUs) as the sole source(s) of propulsion and flight control. Alternatively, the configuration determined by the example configuration identifier 300 may correspond to an independently (e.g., without the APU 100) flight-capable aircraft being supplemented by the APU 100. When the determined configuration does not correspond to the APU 100 being used for supplementary purposes (block 404), the example flight controller 112 selects one(s) of the flight control programs 302 corresponding to the APU(s) 100 being the sole source(s) of propulsion and/or flight control (block 406). In some examples, customized flight control program(s) and/or program information is provided to the flight controller 112 by, for example, a designer (e.g., via the user interface 304) of the aircraft formed using the example APU 100. In such instances, the provided flight control information is selected as the appropriate flight control program and/or used in conjunction with one or more of the stored flight control program(s). The example communicator 308 establishes communication with any other APU(s) 100 of the aircraft identified by, for example, the configuration identifier 300 and/or a user via the user interface 306 (block 408). In some examples, the communicator 308 enforces a security protocol that requires the APU(s) 100 to pass an authorization procedure before the communication can be established. Additionally, the example communicator 308 may require periodic security events in which the APU(s) 100 are required to be reauthorized.

When the appropriate flight control programming has been selected (and initialized) and communication has been established between the components (e.g., the APU(s) 100), the selected flight control program(s) are executed (block 410). Execution of the flight control program(s) 302 involves, for example, detecting conditions, receiving pilot input, calculating responses to condition(s) and/or input(s), operating components, etc. As described above, the example flight control program(s) provided by the example APU(s) 100 are capable of flying the body to which the APU(s) 100 are coupled (e.g., mounted) without receiving any external flight control capability from an external source, such as the body. For example, the APU(s) 100 can be mounted to a body void of any flight control processing, void of any energy source and void of propulsion sources, and can enable such a body to be fully flight capable.

Referring back to block 404, when the example APU 100 is being used for supplementary purposes (e.g., to provide additional, replacement or auxiliary thrust and/or lift) for an existing (e.g., independently flight-capable) aircraft, the example communicator 308 establishes communication with a processing system of the aircraft to which the APU 100 is coupled (e.g., mounted) (block 412). For example, the communicator 308 and the processing system of the aircraft can establish a session (e.g., a handshake) during which data related to the respective components is exchanged. The exchange of information enables the configuration identifier 300 to collect additional information regarding aspect(s) and/or characteristic(s) of the aircraft to which the APU 100 is coupled. In the illustrated example of FIG. 4, the example communicator 308 also obtains flight control information from the processing system of the aircraft to which the APU 100 is coupled. That is, the aircraft to which the APU 100 is mounted may include a flight controller of its own that informs the flight controller 112 of the APU 100 of the native flight control programming of the aircraft.

Based on the obtained information, the example flight controller 112 selects one or more of the flight control programs 302 for the APU 100 (block 416). In some example, one or more aspects of the selected flight control program(s) 302 may be provided by data received from the flight control system of the aircraft to which the APU 100 is mounted. For example, one or more physical attributes of the aircraft may be provided to the selected flight control program(s) 302, which use the physical attribute information as input for one or more flight control calculations.

When the appropriate flight control programming has been selected and communication has been established between the components (e.g., the APU(s) 100 and the aircraft to which the APU(s) 100 are coupled), the selected flight control program(s) are executed (block 410). As described above, although the example APU 100 is capable of autonomously providing flight capabilities to a body without external input, the example flight control program(s) 302 of the example APU 100 are also capable of being executed in conjunction with the flight control capabilities of the aircraft to which the APU 100 is coupled.

In the example of FIG. 4, the selected flight control programming is executed until a shutdown is desired and/or required or when a mode switch is detected (block 418). If a shutdown is not desired or required, the selected flight control program(s) continue execution (block 410). A shutdown may be desired when the corresponding aircraft is powered down and/or in need of maintenance. A mode switch may occur when, for example, the APU 100 is detached (e.g., mid-flight) from a flight capable aircraft to switch from a supplementary mode to a solitary mode. Such a scenario is described below in connection with FIG. 15. If a shutdown and/or mode switch occurs, control passes to block 400.

Figure 5A:
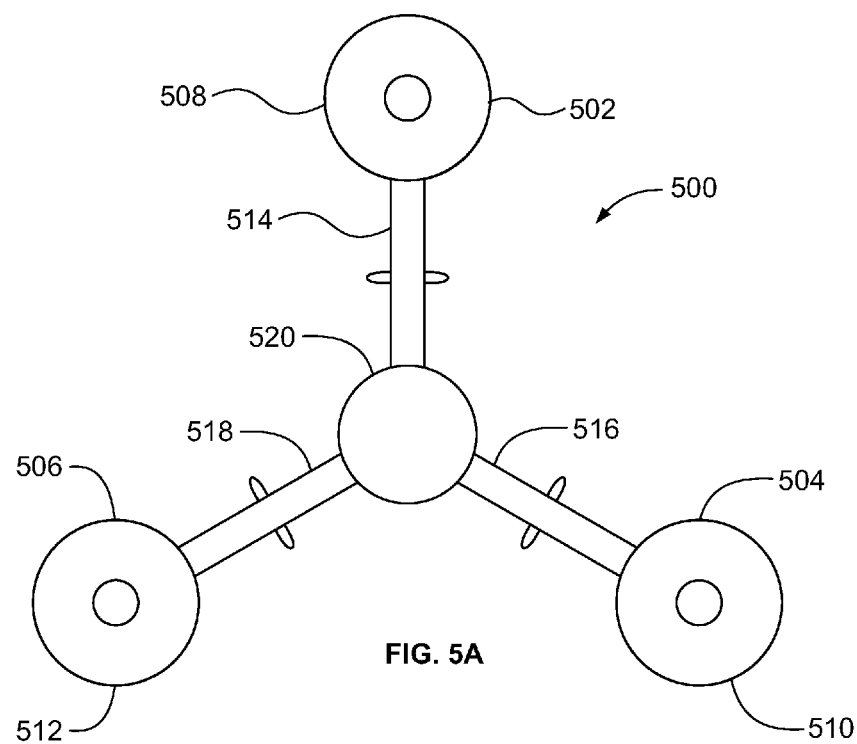
FIG. 5A is an illustration from a first perspective of an example tri-tail sitter constructed using the example APU of FIGS. 1 and/or 2.
Figure 5B:
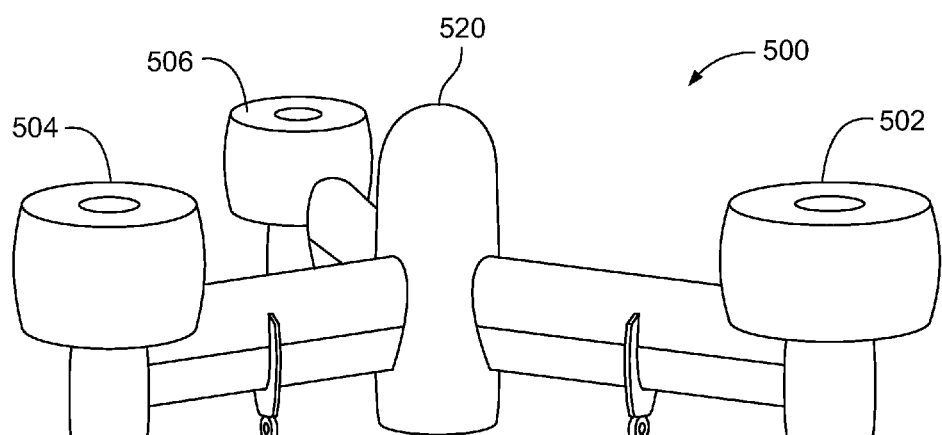
FIG. 5B is an illustration of the example tri-tail sitter of FIG. 5A from a second perspective.

FIG. 5A is a first perspective of an example aircraft formed using the example autonomous propulsion units disclosed herein. The example aircraft of FIG. 5A can be referred to as a tri-tail sitter 500. The example tri-tail sitter 500 of FIG. 5A includes three of the example APU 100 of FIGS. 1 and/or 2. In particular, the example tri-tail sitter 500 of FIG. 5A includes a first APU 502, a second APU 504 and a third APU 506. As described above, the example APUs 502-506 include respective propulsors 508-512 and corresponding aerodynamic members 514-518 (as described above in connection with FIG. 2). In the example of FIG. 5A, each of the aerodynamic members 514-518 is coupled to a body 520. In the example of FIG. 5A, the body 520 is a payload carrying shell void of any flight control processing and void of any energy. Accordingly, the APUs 502-506 do not receive flight control instructions or energy source (e.g., fuel) from the body 520. As described above, the example flight controllers 112 of the APUs 502-506 identify the configuration of the aircraft of FIG. 5A as a tri-tail sitter, obtain information about the body 520 (e.g., via the user interface 304), select the appropriate one(s) of the flight control programs 302, establish communication with each other, and execute the selected flight control program(s) 302. In the illustrated example of FIG. 5A, the first APU 502 is selected as the master device, while the second and third APUs 504, 506 are slave devices for purposes of the flight control programming. The flight controllers 112 of the respective APUs 502-506 collaborate to implement the flight control of the tri-tail sitter 500 in accordance with, for example, detected condition(s) and/or input(s) received from a pilot (e.g., a remotely located pilot providing input from a remote location) and/or an auto-pilot application. A second perspective of the example tri-tail sitter 500 is shown in FIG. 5B.

Figure 6A:
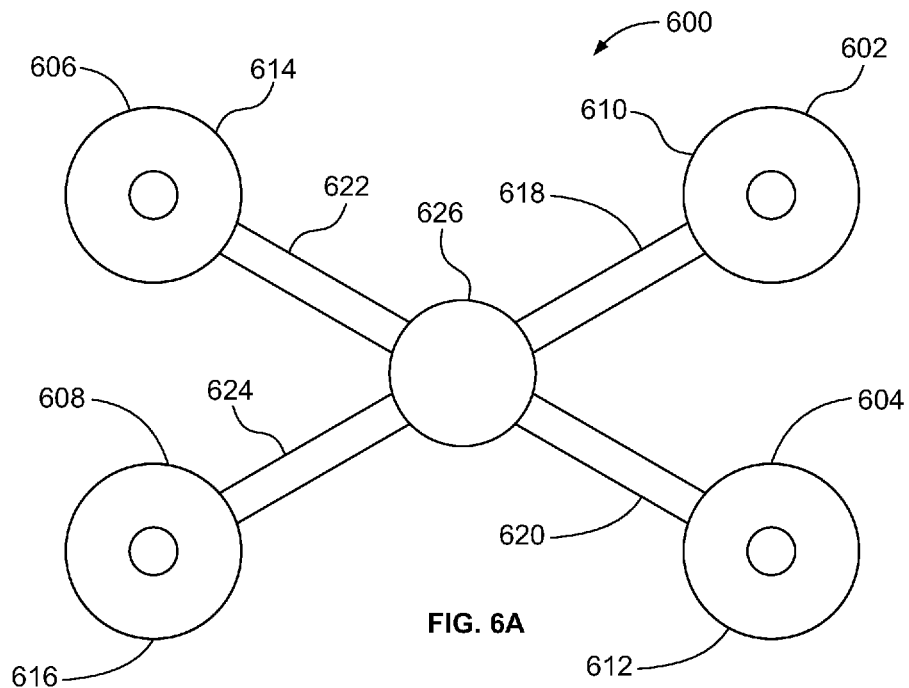
FIG. 6A is an illustration from a first perspective of an example quad-tail sitter constructed using the example APU of FIGS. 1 and/or 2.
Figure 6B:
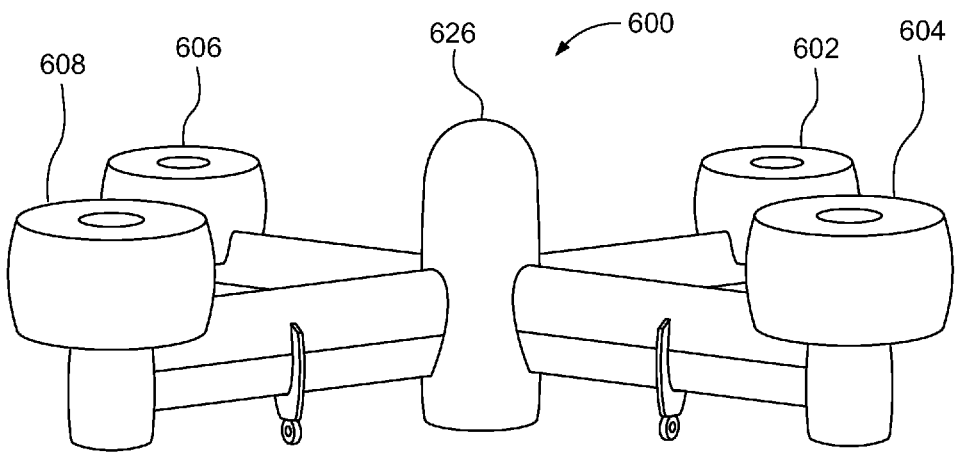
FIG. 6B is an illustration of the example quad-tail sitter of FIG. 6A from a second perspective.

FIG. 6A is a first perspective of another example aircraft formed using the example autonomous propulsion units disclosed herein. The example aircraft of FIG. 6A can be referred to as a quad-tail sitter 600. The example quad-tail sitter 600 of FIG. 6A is similar to the example tri-tail sitter 500 of FIGS. 5A and 5B in that the example quad-tail sitter 600 of FIG. 6A includes a plurality of the example APUs 100 of FIGS. 1 and/or 2 (designated with reference numerals 602-608 in FIG. 6A), each having a respective propulsor 610-616 and corresponding aerodynamic members 618-624, and each being coupled to a payload carrying shell 626 void of any flight control processing and void of any energy. Like the APUs 502-506 of FIGS. 5A and 5B, the APUs 602-608 of FIG. 6A do not receive flight control instructions or energy source (e.g., fuel) from the body 626 to which the APUs 602-608 are coupled. However, the number and arrangement of the APUs 602-608 in FIG. 6A are different than APUs 502-506 in FIGS. 5A and 5B. Accordingly, the example flight controllers 112 of the APUs 602-608 of FIG. 6A identify the configuration of the aircraft of FIG. 6A as a quad-tail sitter and select the appropriate flight control program(s) according to the quad-tail sitter configuration. A second perspective of the example quad-tail sitter 600 is shown in FIG. 6B.

Figure 7A:
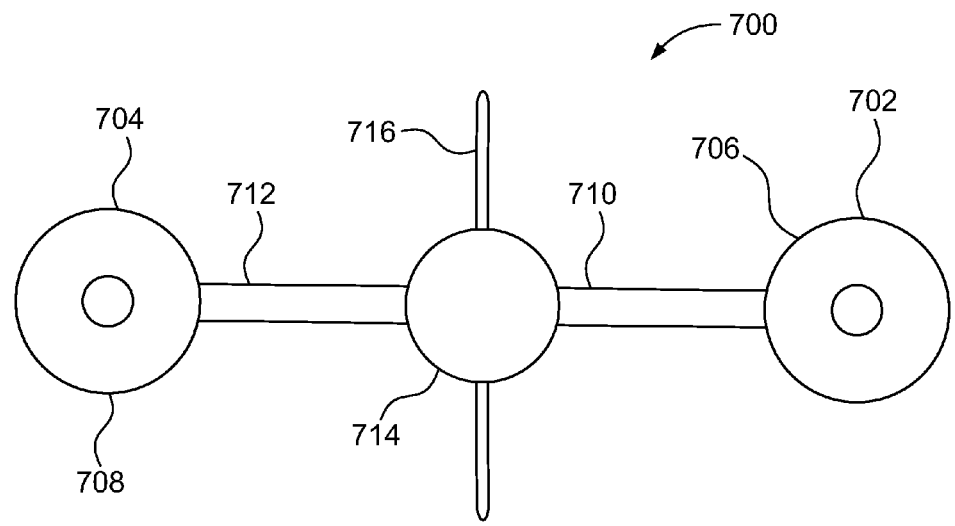
FIG. 7A is an illustration from a first perspective of an example dual-tail sitter constructed using the example APU of FIGS. 1 and/or 2.
Figure 7B:
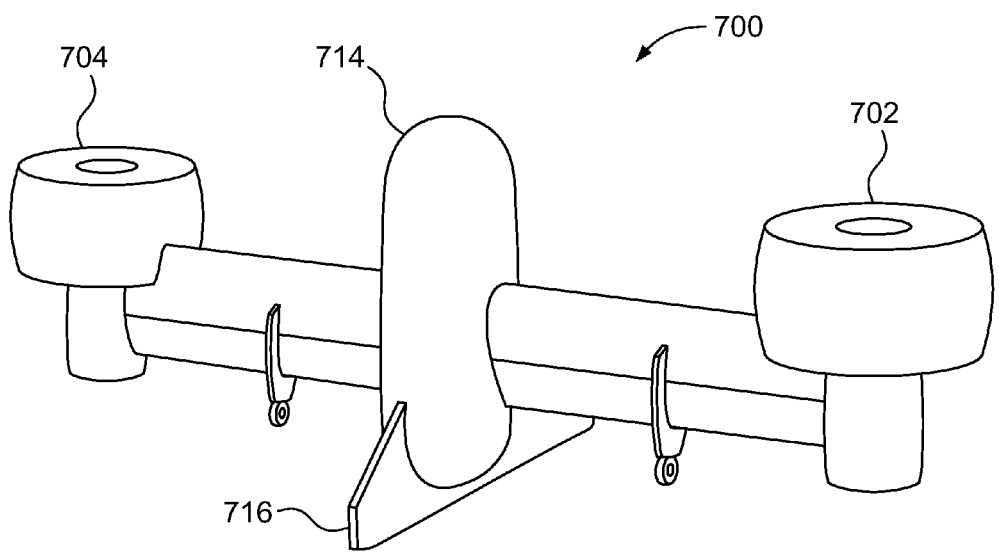
FIG. 7B is an illustration of the example dual-tail sitter of FIG. 7A from a second perspective.

FIG. 7A is a first perspective of another example aircraft formed using the example autonomous propulsion units disclosed herein. The example aircraft of FIG. 7A can be referred to as a dual-tail sitter 700. The example dual-tail sitter 700 of FIG. 7A is similar to the example tri-tail sitter 500 of FIGS. 5A and 5B and the example quad-tail sitter 600 of FIGS. 6A and 6B in that the example dual-tail sitter 700 of FIG. 7A includes a plurality of the example APUs 100 of FIGS. 1 and/or 2 (designated with reference numerals 702, 704 in FIG. 7A), each having a respective propulsor 706, 708 and corresponding aerodynamic members 710, 712, and each being coupled to a payload carrying shell 714 void of any flight control processing and void of any energy. Like the APUs 502-506 of FIGS. 5A and 5B and the APUs 602-606 of FIGS. 6A and 6B, the APUs 702, 704 of FIG. 7A do not receive flight control instructions or energy source (e.g., fuel) from the body 714 to which the APUs 702, 704 are coupled. However, the number and arrangement of the APUs 702, 704 in FIG. 7A are different than APUs 502-506 in FIGS. 5A and 5B and the APUs 602-606 in FIGS. 6A and 6B. Further, the example body 714 of the example dual-tail sitter 700 includes or is coupled to a fin 716 to, for example, provide stability and/or one or additional adjustable aerodynamic surfaces. Accordingly, the example flight controllers of the APUs 702, 704 of FIG. 7A identify the configuration of the aircraft of FIG. 7A as a dual-tail sitter having the fin 716 and select the appropriate flight control program(s) according to the dual-tail sitter configuration. A second perspective of the example dual-tail sitter 700 is shown in FIG. 7B.

Figure 8A:
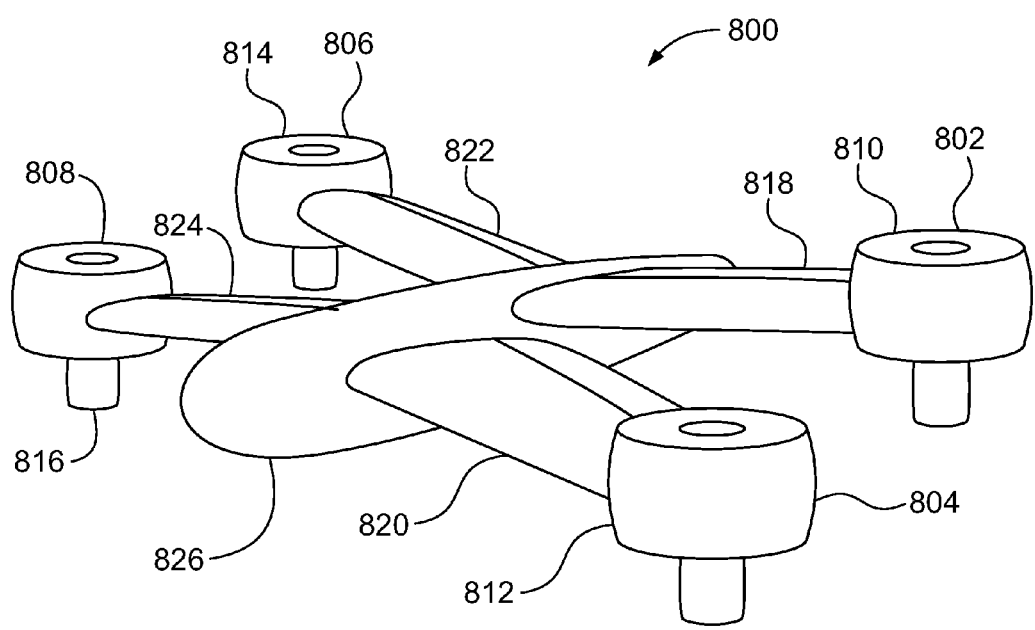
FIG. 8A is an illustration from a first perspective of an example quad-tilt duct aircraft constructed using the example APU of FIGS. 1 and/or 2.
Figure 8B:
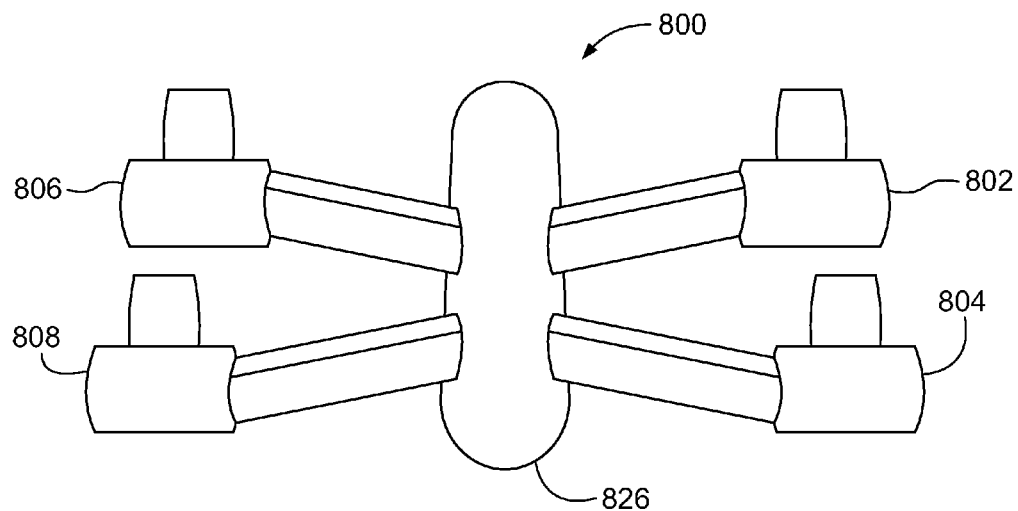
FIG. 8B is an illustration of the example quad-tilt duct aircraft of FIG. 8A from a second perspective.
Figure 8C:
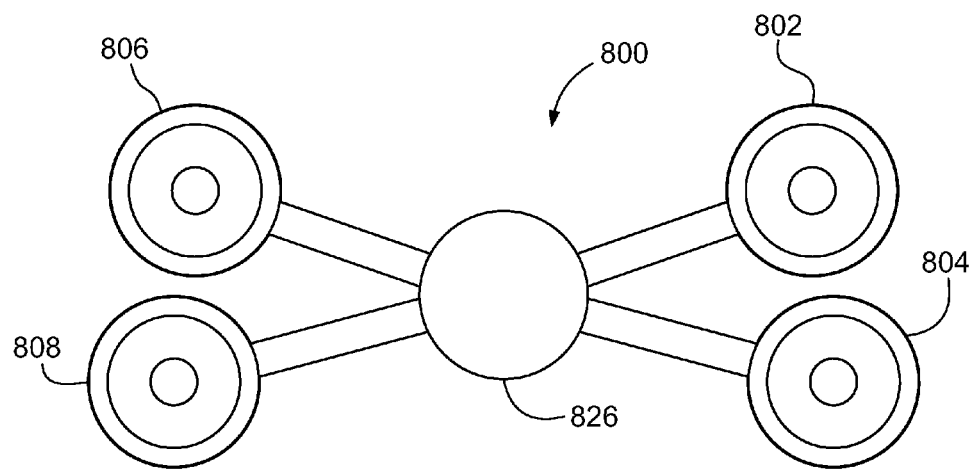
FIG. 8C an illustration of the example quad-tilt duct aircraft of FIG. 8A from a third perspective.

FIG. 8A is a first perspective of another example aircraft formed using the example autonomous propulsion units disclosed herein. The example aircraft of FIG. 8A can be referred to as a quad-tilt duct aircraft 800. The example quad-tilt duct aircraft 800 of FIG. 8A includes four of the example APUs 100 of FIGS. 1 and/or 2 (designated with reference numerals 802-808 in FIG. 8A), each having a respective propulsor 810-816 and corresponding aerodynamic members 818-824. In the illustrated example of FIG. 8A, the propulsors 810-816 are shown in a tilted position relative to, for example, the aerodynamic members 818-824. In the illustrated example, the tilted position of the propulsors 810-816 correspond to a lift position in which the quad-tilt duct aircraft 800 is taking off, landing, or performing a vertical maneuver. FIGS. 8B and 8C provide other perspectives of the example quad-tilt duct aircraft 800 of FIG. 8A in which the propulsors 810-816 are in a different tilt position. In particular, FIGS. 8B and 8C show the propulsors 810-816 positioned to provide (mainly) horizontal thrust during, for example, an acceleration maneuver. In the example of FIG. 8A, each of the aerodynamic members 818-824 is coupled to a body 826. In the example of FIG. 8A, the body 826 is a payload carrying shell void of any flight control processing and void of any energy source. Accordingly, the APUs 802-808 do not receive flight control instructions or energy (e.g., fuel) from the body 826. Accordingly, the example flight controllers 112 of the APUs 802-808 identify the configuration of the aircraft of FIG. 8A as a quad-tilt duct aircraft 800 and select the appropriate flight control program(s) 302 according to the quad-tilt duct configuration.

Figure 9:
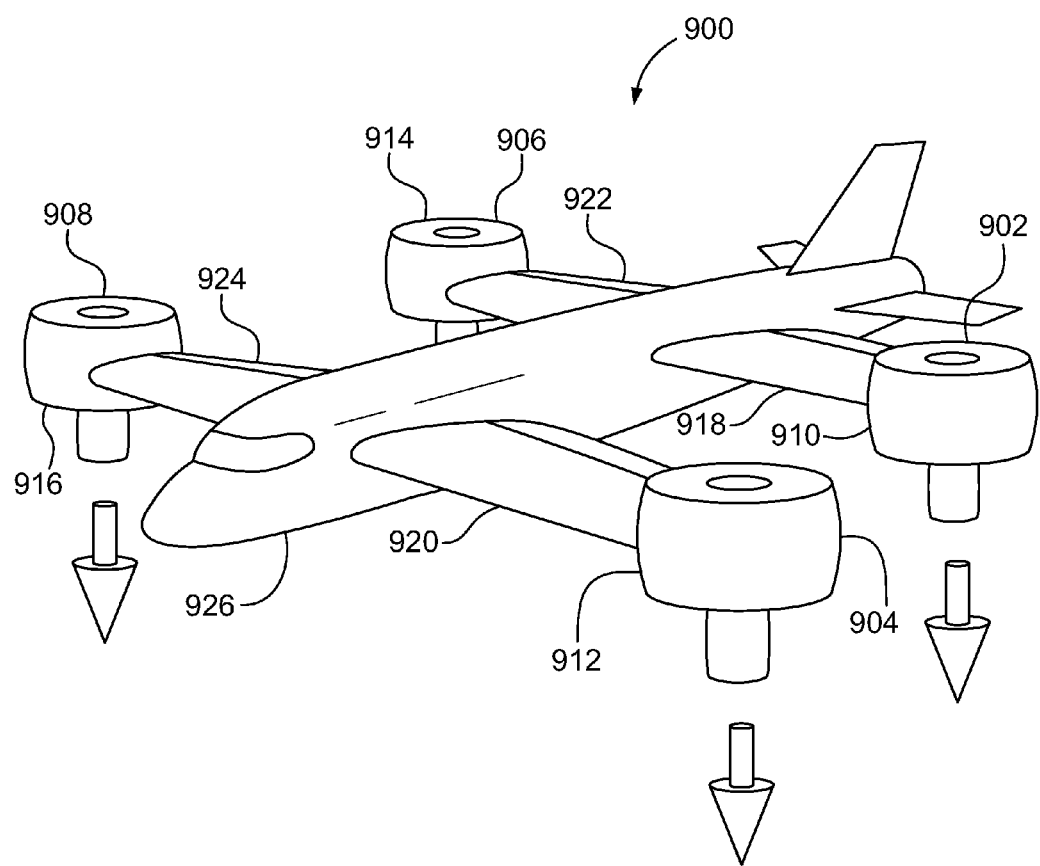
FIG. 9 is an illustration of another example quad-tilt duct aircraft constructed using the example APU of FIGS. 1 and/or 2.

FIG. 9 is another example aircraft formed using the example autonomous propulsion units disclosed herein. The example aircraft of FIG. 9 can be referred to as a quad-tilt duct aircraft 900. The example quad-tilt duct aircraft 900 of FIG. 9 includes four of the example APUs 100 of FIGS. 1 and/or 2 (designated with reference numerals 902-908 in FIG. 9), each having a respective propulsor 910-916 and corresponding aerodynamic members 918-924. Similar to the propulsors 802-808 of FIG. 8A, the propulsors 910-916 of FIG. 9 are shown in a tilted position corresponding to a lift position, and can be moved to a different tilt position. In the example of FIG. 9, each of the aerodynamic members 918-924 is coupled to a body 926. In the example of FIG. 9, the body 926 is equipped to carry a pilot and/or a team. However, the example quad-tilt aircraft 900 may also be implemented as an unmanned aircraft. The example body 926 includes controls to be used by the pilot and/or team to provide input to components of the body 926 and/or the flight controllers 112 of the APUs 902-908 via, for example, the user interface 304 described above in connection with FIG. 3. In particular, information received via the user interface 304 from the pilot and/or team is input for the selected flight control program(s). Thus, in some instances, while the flight controllers 112 of the example APUs 902-908 receive input from the body 926, the received input is not originated from a flight control program (e.g., is not a flight control instruction) but rather an input from a pilot, such as a movement of a stick, gear, knob, electronic instrumentation, etc. Accordingly, the APUs 902-908 do not receive flight control instructions (e.g., data generated by a flight control program) from the body 926, but can receive input from a pilot. As described above, the example flight controllers 112 of the APUs 902-908 identify the configuration of the aircraft of FIG. 9 as a manned quad-tilt duct aircraft 900 and select the appropriate flight control program(s). The flight controllers 112 of the respective APUs 902-908 collaborate (e.g., with each other and the input from the pilot) to implement the flight control of the quad-tilt duct aircraft 900.

Figure 10:
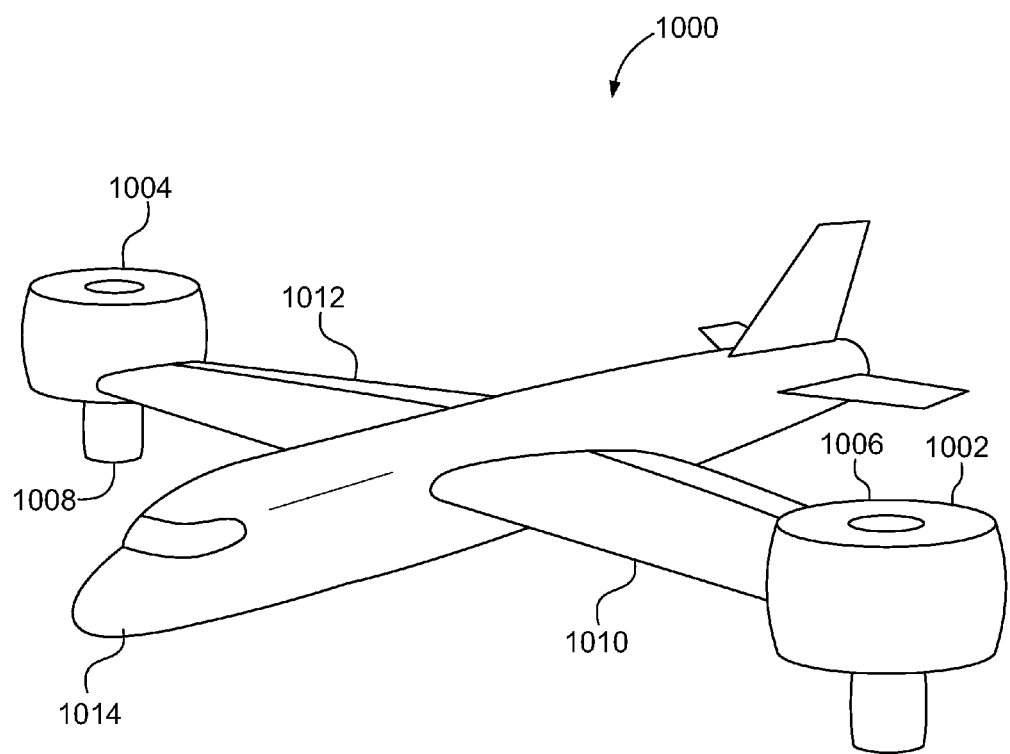
FIG. 10 is an illustration of an example dual-tilt duct aircraft constructed using the example APU of FIGS. 1 and/or 2.

FIG. 10 is another example aircraft formed using the example autonomous propulsion units disclosed herein. The example aircraft of FIG. 10 can be referred to as a dual-tilt duct aircraft 1000. The example dual-tilt duct aircraft 1000 of FIG. 10 includes two of the example APUs 100 of FIGS. 1 and/or 2 (designated with reference numerals 1002, 1004 in FIG. 10) each having a respective propulsor 1006, 1008 and corresponding aerodynamic members 1010, 1012. The example APUs 1002, 1004 of FIG. 10 are similar to the APUs 902-908 of FIG. 9 in that the propulsors 1006, 1008 can be tilted to different positions relative to, for example, the respective aerodynamic members 1010, 1012. In the example of FIG. 10, each of the aerodynamic members 1010, 1012 is coupled to a body 1014 equipped to carry a pilot and/or a team and including controls to be used by the pilot and/or team to provide input to the flight controllers 112 of the APUs 1002, 1004. However, the example dual-tilt duct aircraft 1000 may also be implemented as an unmanned aircraft. As described above, the example flight controllers 112 of the APUs 1002, 1004 identify the configuration of the aircraft of FIG. 10 as a manned dual-tilt duct aircraft and select the appropriate flight control program(s). The flight controllers 112 of the respective APUs 1002, 1004 collaborate (e.g., with each other and the input from the pilot) to implement the flight control of the dual-tilt duct aircraft 1000.

Figure 11:
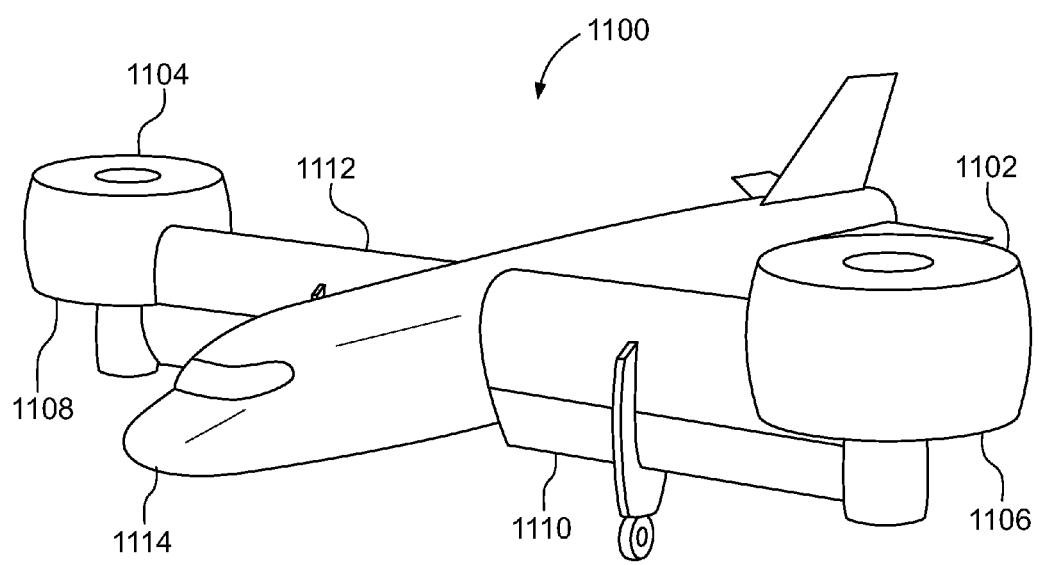
FIG. 11 is an illustration of an example dual-tilt wing aircraft constructed using the example APU of FIGS. 1 and/or 2.

FIG. 11 is another example aircraft formed using the example autonomous propulsion units disclosed herein. The example aircraft of FIG. 11 can be referred to as a dual-tilt wing aircraft 1100. The example dual-tilt wing aircraft 1100 of FIG. 11 includes two of the example APUs 100 of FIGS. 1 and/or 2 (designated with reference numerals 1102, 1104 in FIG. 11) each having a respective propulsor 1106, 1108 and corresponding aerodynamic members 1110, 1112. The example dual-tilt wing aircraft 1100 of FIG. 11 is similar to the dual-tilt duct aircraft 1000 of FIG. 10. However, the example aerodynamic members 1110, 1112 of FIG. 11 are adjustable relative to a body 1114 to which the APUs 1102, 1104 are mounted. In some examples, the propulsors 1106, 1108 are additionally or alternatively adjustable relative to the aerodynamic members 1110, 1112. In the example of FIG. 11, the body 1114 is equipped to carry a pilot and/or a team and including controls to be used by the pilot and/or team to provide input to the flight controllers 112 of the APUs 1102, 1104. However, the example dual-tilt wing aircraft 1100 may also be implemented as an unmanned aircraft. As described above, the example flight controllers 112 of the APUs 1102, 1104 identify the configuration of the aircraft of FIG. 11 as a manned dual-tilt wing aircraft and select the appropriate flight control program(s). The flight controllers of the respective APUs 1102, 1104 collaborate (e.g., with each other and the input from the pilot) to implement the flight control of the dual-tilt wing aircraft 1100.

Figure 12A:
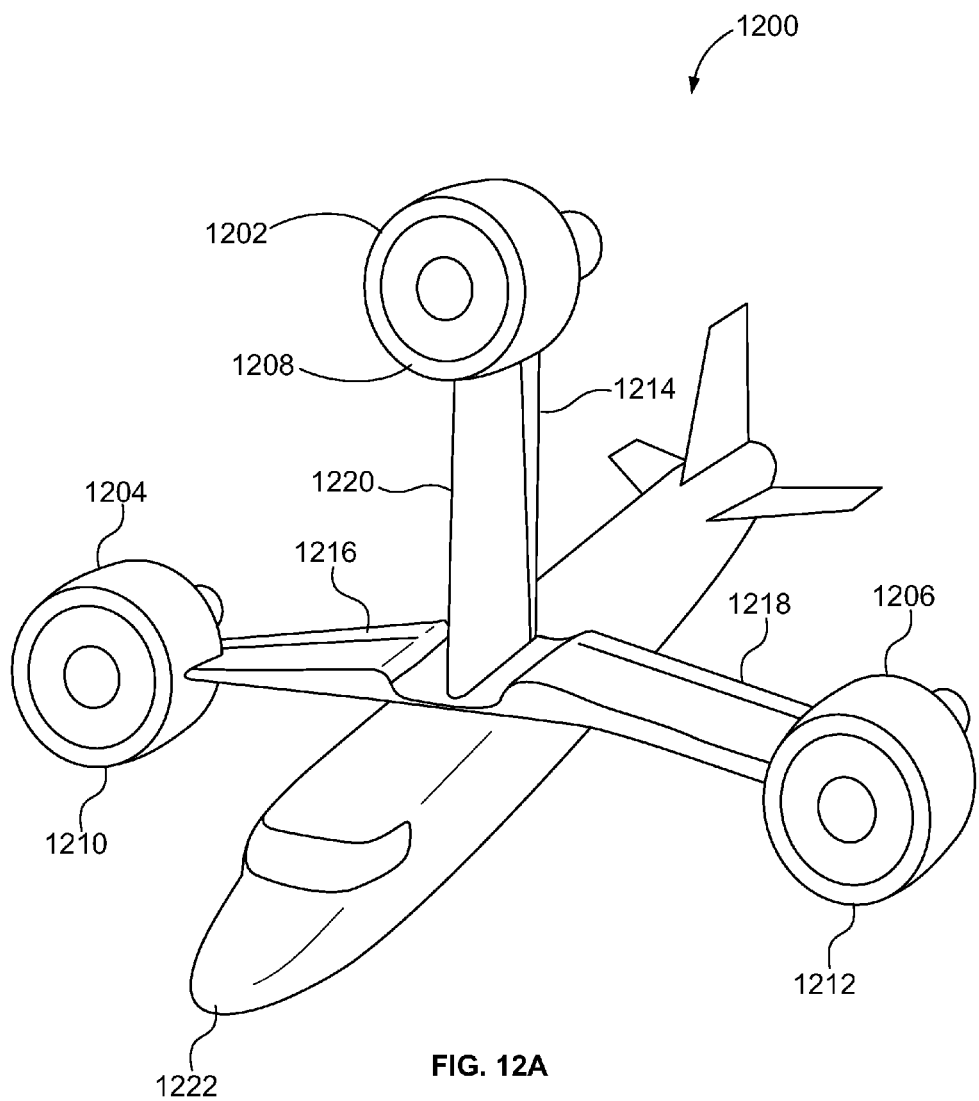
FIG. 12A is an illustration of an example tri-fuselage aircraft constructed using the example APU of FIGS. 1 and/or 2.
Figure 12B:
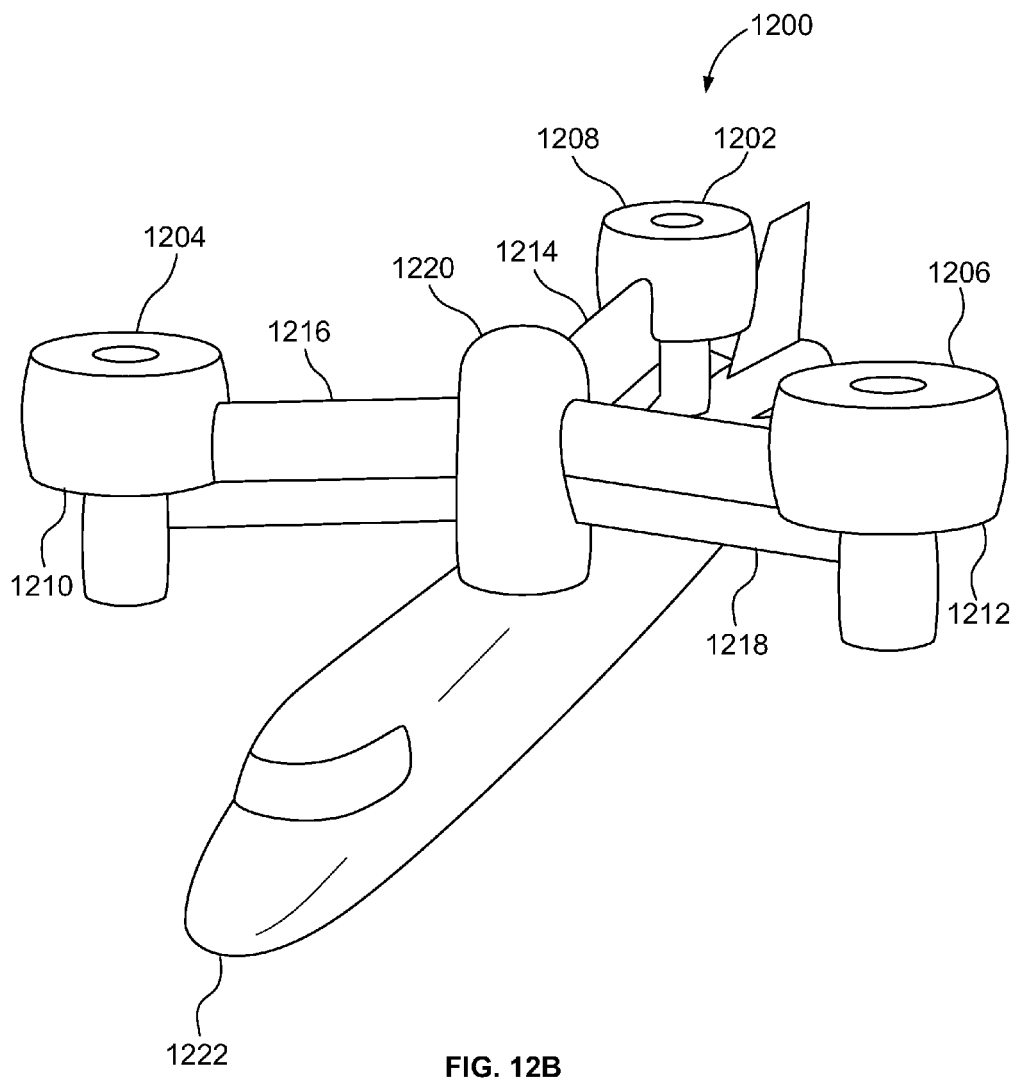
FIG. 12B is an illustration of the example tri-fuselage aircraft of FIG. 12A in a different configuration.

FIG. 12A is another example aircraft formed using the example autonomous propulsion units disclosed herein. The example aircraft of FIG. 12A can be referred to as a tri-fuselage aircraft 1200. The example tri-fuselage aircraft 1200 of FIG. 12A includes three of the example APUs 100 of FIGS. 1 and/or 2 (designated with reference numerals 1202-1206 in FIG. 9), each having a respective propulsor 1208-1212 and corresponding aerodynamic members 1214-1218. In the example of FIG. 12A, the three APUs 1202-1206 form an assembly 1220 that can be tilted different positions relative to a body 1222 to which the assembly 1220 is coupled (e.g., hinge or pivot mounted). That is, all of the APUs 1202-1206 can be moved at the same time by moving the assembly 1220 from one hinged position to another. For example, the assembly 1220 is shown in a first position in FIG. 12A, while FIG. 12B illustrates the assembly 1220 in a second, different position. The position of the assembly 1220 in FIG. 12A corresponds to the APUs 1202-1206 providing (mainly) lateral thrust for the body 1222. The position of the assembly 1220 of FIG. 12B corresponds to the APUs 1202-1206 providing (mainly) vertical lift for the body 1222. In some examples, the assembly 1220 can be moved to incremental positions within a range defined by the first and second positions of FIGS. 12A and 12B, respectively. Alternatively, the positions of the assembly 1220 may be limited to those shown in FIGS. 12A and 12B. In the example of FIG. 12, the body 1222 is equipped to carry a pilot and/or a team. However, the example tri-fuselage aircraft 1200 may also be implemented as an unmanned aircraft. As described above, the example flight controllers of the APUs 1202-1206 identify the configuration of the aircraft of FIG. 12A as a tri-fuselage aircraft and select the appropriate flight control program(s). The flight controllers of the respective APUs 1202-1206 collaborate (e.g., with each other and the input from the pilot) to implement the flight control of the tri-fuselage aircraft 1200.

Figure 13:
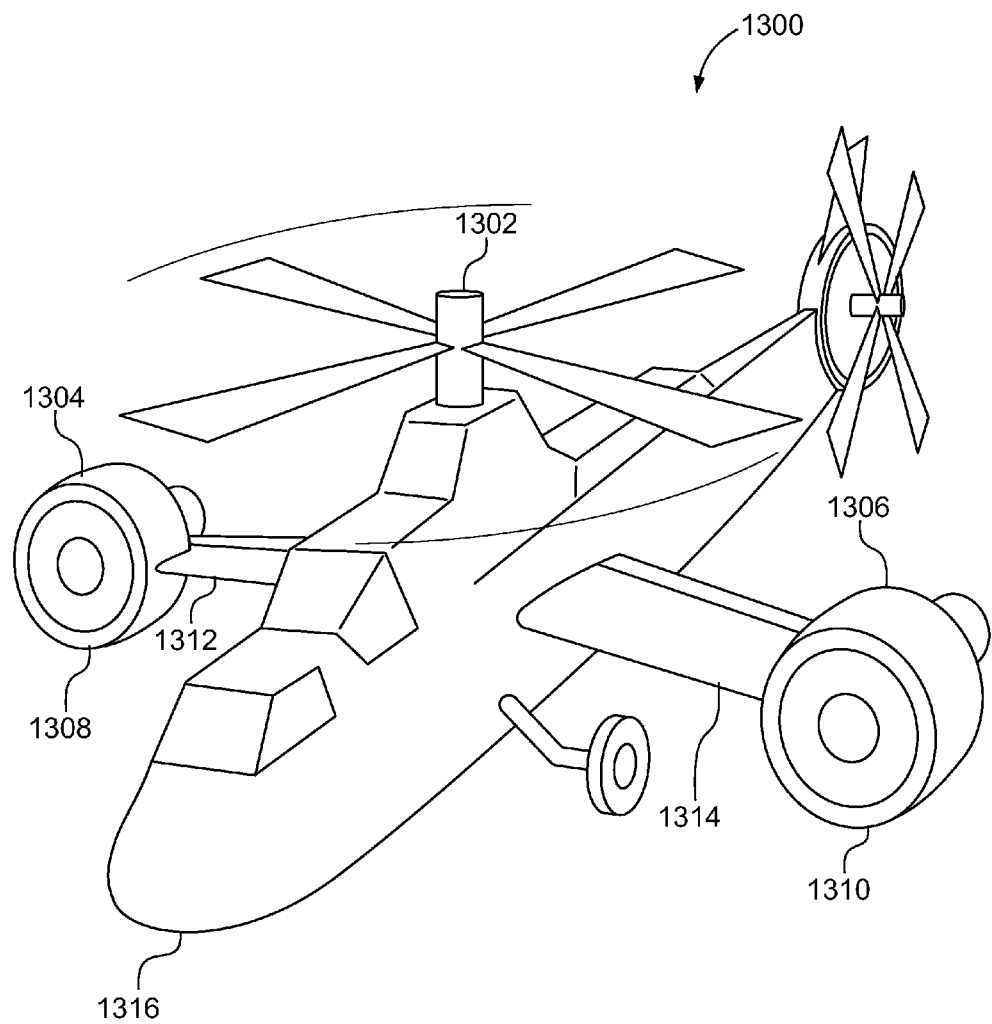
FIG. 13 is an illustration of an example rotor craft having the example APU of FIGS. 1 and/or 2 mounted thereto.

FIG. 13 is another example aircraft formed using the example autonomous propulsion units disclosed herein. The example aircraft of FIG. 13 is a rotor craft 1300 having its own propulsion system generally referred to herein with reference numeral 1302. The example rotor craft 1300 of FIG. 13 includes two of the example APUs 100 of FIGS. 1 and/or 2 (designated with reference numerals 1304, 1306 in FIG. 13), each having a respective propulsor 1308, 1310 and corresponding aerodynamic members 1312, 1314. In the example of FIG. 13, the two APUs 1304, 1306 have been mounted to the rotor craft 1300 to supplement the existing propulsion system 1302. That is, the two APUs 1304, 1306 of FIG. 13 have been mounted to the rotor craft 1300 to provide replacement, auxiliary and/or additional thrust and/or lift to the rotor craft 1300. As described above, the propulsors 1308, 1310 can be tilted to different positions to provide vertical lift and/or lateral thrust. In the example of FIG. 13, a body 1316 to which the APUs 1304, 1306 are mounted is equipped to carry a pilot and/or a team and has its own flight control capabilities (e.g., to control the propulsion system 1302 and/or additional components). As such, the example configuration identifiers 300 of the flight controllers 112 of the APUs 1304, 1306 determine that the APUs 1304, 1306 are being implemented on the type of rotor craft shown in FIG. 13 and select the appropriate flight program(s) 302. Communication is established between the APU flight controllers 112 and the existing flight control system of the rotor craft 1300. In the illustrated example, the APUs 1304, 1306 are slave devices to the master flight control system of the rotor craft 1300. The flight controllers 112 of the respective APUs 1304, 1306 collaborate (e.g., with each other and the input from the pilot of the rotor craft 1300) to implement the flight control of the rotor craft 1300.

Figure 14:
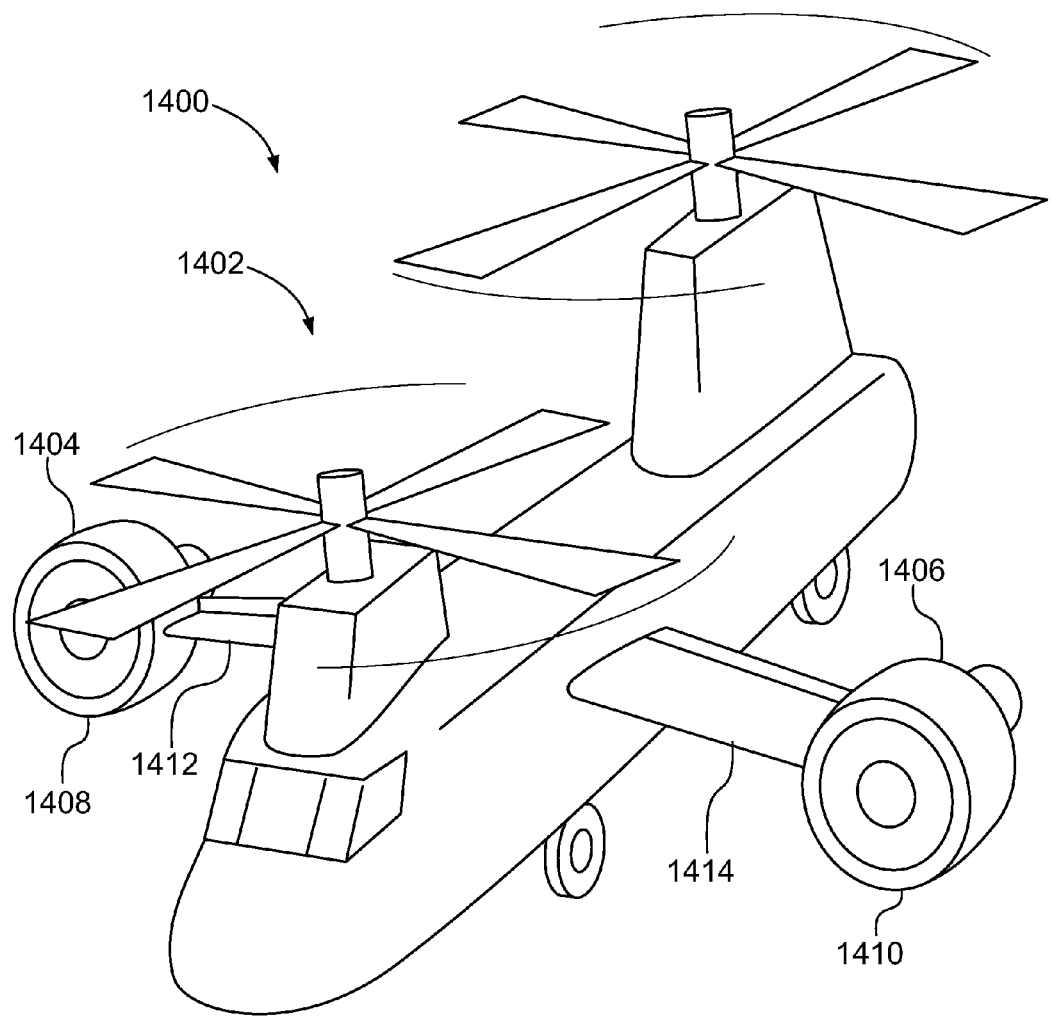
FIG. 14 is an illustration of another example rotor craft having the example APU of FIGS. 1 and/or 2 mounted thereto.

FIG. 14 is another rotor craft 1400 formed using the example autonomous propulsion units disclosed herein. The example rotor craft of FIG. 14 has its own propulsion system generally referred to herein with reference numeral 1402. Unlike the propulsion system 1302 of FIG. 13, the example propulsion system of FIG. 14 includes two blades controlled by a flight control system of the rotor craft 1400. Like the rotor craft 1300 of FIG. 13, the example rotor craft 1400 of FIG. 14 includes two of the example APUs 100 of FIGS. 1 and/or 2 (designated with reference numerals 1404, 1406 in FIG. 14), each having a respective propulsor 1408, 1410 and corresponding aerodynamic members 1412, 1414. Moreover, the example APUs 1404, 1406 have been mounted to the rotor craft 1400 to supplement the existing propulsion system 1402. As such, the example configuration identifiers 300 of the flight controllers 112 of the APUs 1404, 1406 determine that the APUs 1404, 1406 are being implemented on the type of rotor craft shown in FIG. 14 and select the appropriate flight program(s) 302. The flight controllers 112 of the respective APUs 1404, 1406 collaborate (e.g., with each other and the input from the pilot of the rotor craft 1400) to implement the flight control of the rotor craft 1400.

Figure 15:
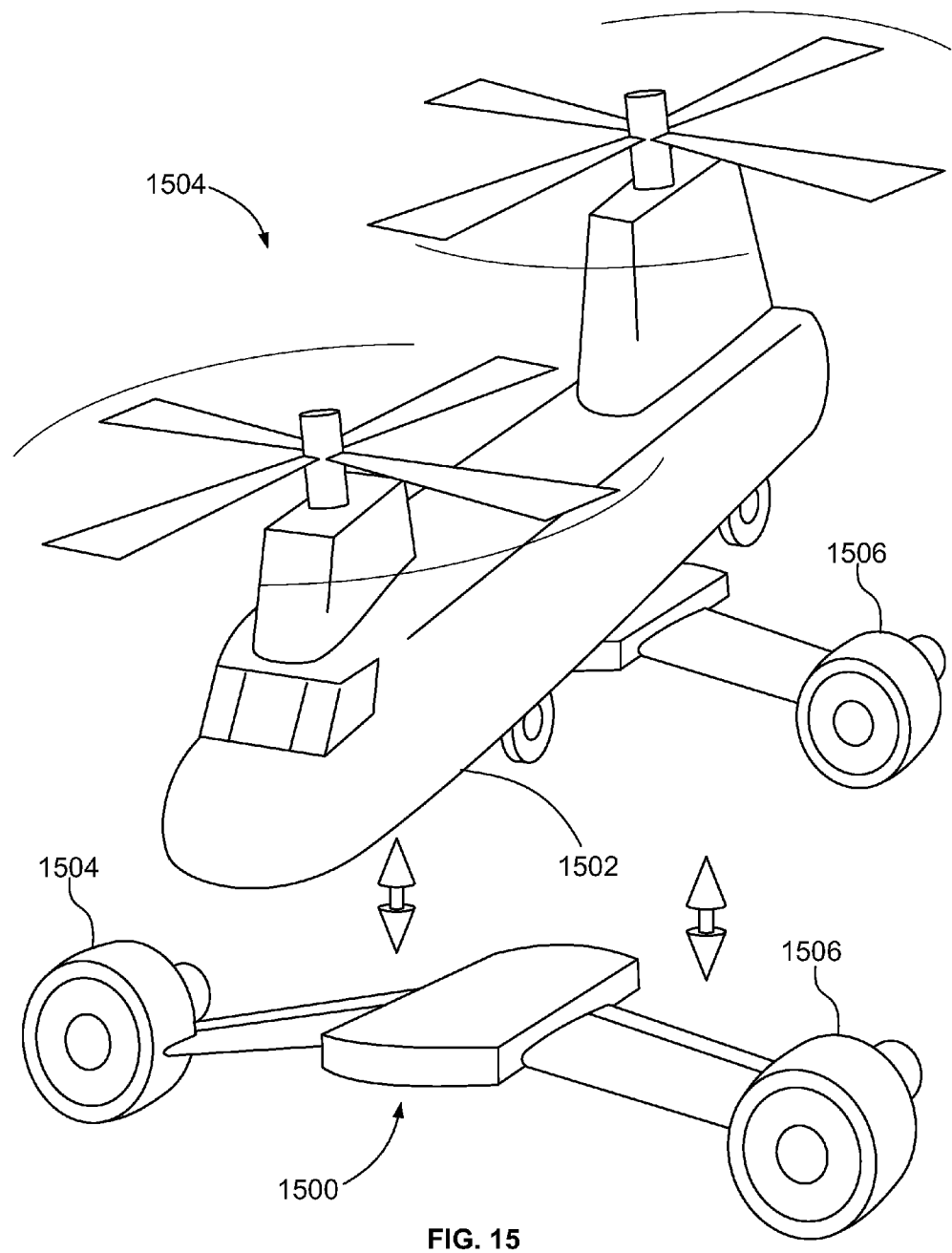
FIG. 15 is an illustration of an example APU assembly constructed in accordance with teachings of this disclosure.

FIG. 15 illustrates an APU assembly 1500 that can be detachably mounted to, for example, an example rotor craft 1502 shown in FIG. 15. In the example of FIG. 15, the rotor craft 1502 has a native flight control system to control, among other components, a native propulsion system 1504. The example APU assembly 1500 of FIG. 15 includes two of the example APUs 100 of FIGS. 1 and/or 2 (designated with reference numerals 1504, 1506 in FIG. 15). When coupled to the rotor craft 1500, the example APU assembly 1500 of FIG. 5 provides auxiliary, additional and/or replacement thrust and/or lift to the rotor craft 1502 in a similar fashion as the APUs 1404, 1406 of FIG. 14. In such instances, the APUs 1504, 1506 are in a first mode, which may be referred to as a supplementary mode. However, the example APU assembly 1500 of FIG. 15 may be detached from the rotor craft 1502 mid-flight. In such instances, the example APU assembly 1500 of FIG. 15 becomes an unmanned, flight capable aircraft due to the autonomous capabilities of the APUs 1504, 1506. When the APU assembly 1500 detaches from the rotor craft 1502, the APU assembly 1500 is in a second mode, which may be referred to as a solitary mode. Thus, when in the supplementary mode, the APUs 1504, 1506 provide supplementary propulsion and/or flight control capabilities. When in the solitary mode, the APUs 1504, 1506 are the sole source of propulsion and flight control capability. In the illustrated example, the configuration identifier 300 of the flight controller 112 can detect whether the APU assembly 1500 is in the supplementary mode or the solitary mode and may select appropriate flight control program(s) for each mode.

Figure 16:
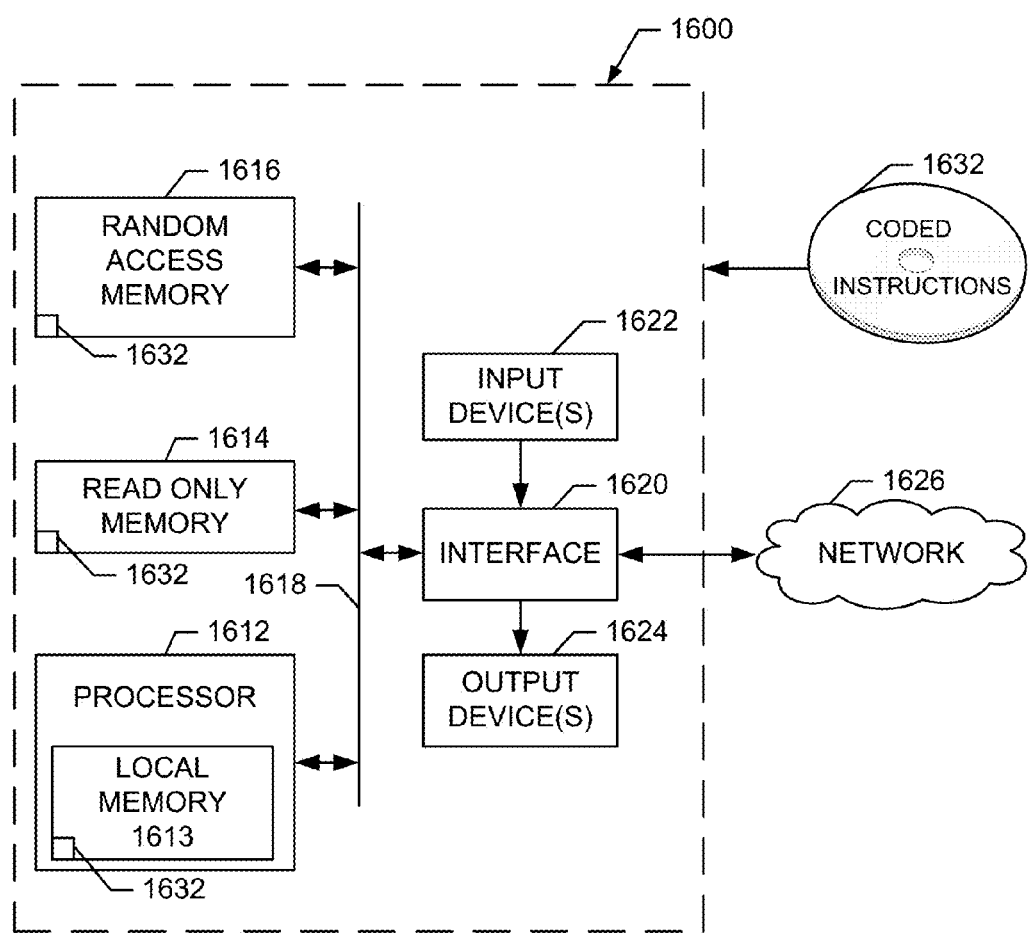
FIG. 16 is an example processing platform capable of implementing the example flight controller of FIGS. 1, 2 and/or 3.

FIG. 16 is a block diagram of an example processor platform 1600 capable of executing the instructions of FIG. 4 to implement the example flight controller 112 of FIGS. 1 and/or 2. The processor platform 1600 can be any suitable computing device such as, for example, a computer, a system on chip (SoC) and/or ASIC.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) 1622 can be implemented by, for example, a sensor, a button, etc.

One or more output devices 1624 are also connected to the interface circuit 1620 of the illustrated example. The output devices 1624 can be implemented, for example, a light emitting diode (LED).

The interface circuit 1620 of the illustrated example also includes a communication device such as a transmitter, a receiver, a transceiver, and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

Coded instructions 1632 to implement the process of FIG. 4 may be stored in the volatile memory 1614 and/or in the non-volatile memory 1616 and/or a removable storage medium.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An autonomous propulsion apparatus comprising:
   a central body; and
   a plurality of propulsion units removably attachable to the central body to configure the autonomous propulsion apparatus as a first aircraft or a second aircraft different than the first aircraft, each propulsion unit having an aerodynamic member and a propulsor, the aerodynamic member to attach the propulsor to the central body, the propulsor to move between a first position to generate lift to enable the apparatus to hover and a second position to generate thrust to enable forward flight of the apparatus.

2. The apparatus of claim 1, wherein the first aircraft includes two propulsion units and the second aircraft includes at least three propulsion units.

3. The apparatus of claim 2, further including:
   a flight controller to determine a number of propulsors attached to the central body, select a flight control instruction from a plurality of flight control instructions stored in a memory of the apparatus based on the determined number of propulsors, and execute the selected the flight control instruction, and
   the propulsors to generate propulsion in accordance with the selected flight control instruction, wherein the flight controller is to provide flight control for the propulsors in an absence of flight control instructions from the central body.

4. The apparatus of claim 3, wherein the memory includes a first flight control program corresponding to a first plurality of propulsion units defining the first aircraft and a second flight control program corresponding to a second plurality of propulsion units defining the second aircraft different than the first aircraft.

5. The apparatus of claim 3, further comprising an adjustable aerodynamic surface, wherein the flight controller is capable of providing flight control for the aerodynamic surface in an absence of flight control instructions from the central body.

6. The apparatus of claim 3, further comprising an internal housing to carry an energy source, wherein the flight controller is to control use of the energy source by the propulsors in an absence of flight control instructions from the central body.

7. The apparatus of claim 3, wherein each propulsor includes a tilt mechanism to enable the propulsor to be positioned at different angles relative to the central body, wherein the flight controller is to control the tilt mechanism in an absence of flight control instructions from the central body.

8. The apparatus of claim 1, wherein the propulsion units remain attached to the central body during an entire flight mission of the apparatus.

9. The apparatus of claim 1, wherein the propulsion units are attachable to the apparatus prior to, or after, a flight mission of the apparatus.

10. The apparatus of claim 1, wherein the aerodynamic member includes a rigid aerodynamic member and an adjustable aerodynamic member.

11. The apparatus of claim 1, wherein the propulsor is spaced from the central body by a distance provided by the aerodynamic member.

12. The apparatus of claim 1, wherein the propulsor is to tilt relative to the aerodynamic member between the first position and the second position via a tilt shaft.

13. The apparatus of claim 12, wherein the tilt shaft is coupled to the propulsor, the tilt shaft extending between a first end and a second end of the aerodynamic member such that a longitudinal axis of the tilt shaft is substantially parallel relative to a longitudinal axis of the aerodynamic member.

14. The apparatus of claim 13, further including a first bearing adjacent the first end of the aerodynamic member and a second bearing adjacent the second end of the aerodynamic to enable rotation of the tilt shaft relative to the aerodynamic member.

15. The apparatus of claim 12, further including a landing gear coupled to the aerodynamic member.

16. The apparatus of claim 1, wherein the first aircraft is a dual-tail sitter and the second aircraft is a tri-tail sitter.

17. An aircraft, comprising:
   a main body;
   a first wing having a first end and a second end, the first wing being removably coupled to the main body via the first end of the first wing;
   a first propulsion unit coupled to the second end of the first wing, the first wing to mount the first propulsion unit to the main body when the first end of the wing is coupled to the main body, the first propulsion unit including a first flight controller;
   a second wing having a third end and a fourth end, the second wing being removably coupled to the main body via the third end of the second wing; and
   a second propulsion unit coupled to the fourth end of the second wing, the second wing to mount the second propulsion unit to the main body when the second wing is coupled to the main body, the second propulsion unit including a second flight controller, the first flight controller to communicate with the second flight controller to provide flight capabilities to the main body without receiving a flight control instruction from the main body.

18. An aircraft as defined in claim 17, wherein the main body does not include a flight control processing system.

19. An aircraft as defined in claim 17, wherein the first flight controller is designated as a master device and the second flight controller is designated as a slave device.

20. An aircraft as defined in claim 17, wherein the first and second propulsion units are sole sources of propulsion for the aircraft.

21. An aircraft as defined in claim 17, wherein the first and second propulsion units are tiltable duct fans.

22. An aircraft as defined in claim 17, wherein the aircraft is removably coupled to a second aircraft such that the aircraft can be removed from the second aircraft mid-flight.

23. An aircraft as defined in claim 22, wherein the second aircraft includes a native flight controller.

24. The aircraft of claim 17, wherein the first propulsion unit and the second propulsion unit are to remain attached to the main body during an entire flight mission of the aircraft.

25. An autonomous propulsion apparatus comprising:
a body to which a first propulsion unit and a second propulsion unit are coupled and non-detachable in-flight, the first propulsion unit to include a first energy source to enable the first propulsion unit to be energy self-sufficient, the second propulsion unit to include a second energy source to enable the second propulsion unit to be energy self-sufficient.

26. The apparatus of claim 25, wherein the first propulsion unit includes a first propulsor independently rotatably coupled to the body to enable a thrust angle of the first propulsor to change relative to the body, the second propulsion unit including a second propulsor unit independently rotatably coupled to the body to enable a thrust angle of the second propulsor to change relative to the body.

27. The apparatus of claim 25, further comprising an aircraft, wherein the autonomous propulsion apparatus is to removably attach to the aircraft to supplement a thrust output of the aircraft.

\* \* \* \* \*